MEMORY ALLOCATION

INVENTORS
ROBERT M. TOMASULO
JAMES R. KERSEY
FREDERICK M. TRAPNELL, JR.
ROY WIIG
BY Gunter A. Hauptman
ATTORNEY

SEND

RECEIVE

SEND/RECEIVE

March 15, 1966 R. M. TOMASULO ETAL 3,241,125

MEMORY ALLOCATION

Filed May 22, 1962 14 Sheets-Sheet 5

FIG. 3d MESSAGE ASSEMBLY AND SOURCE
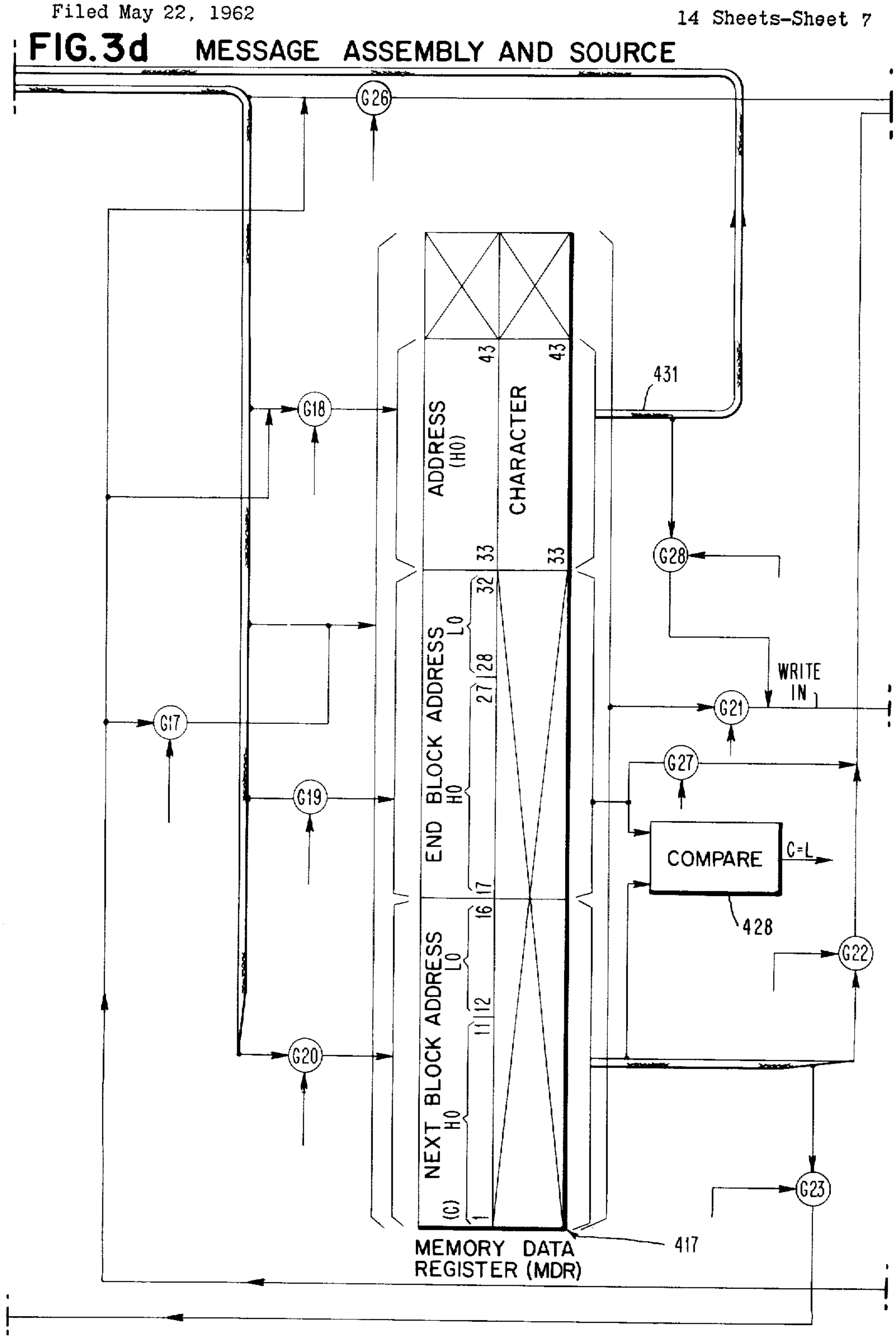

FIG. 3e MESSAGE ASSEMBLY AND SOURCE
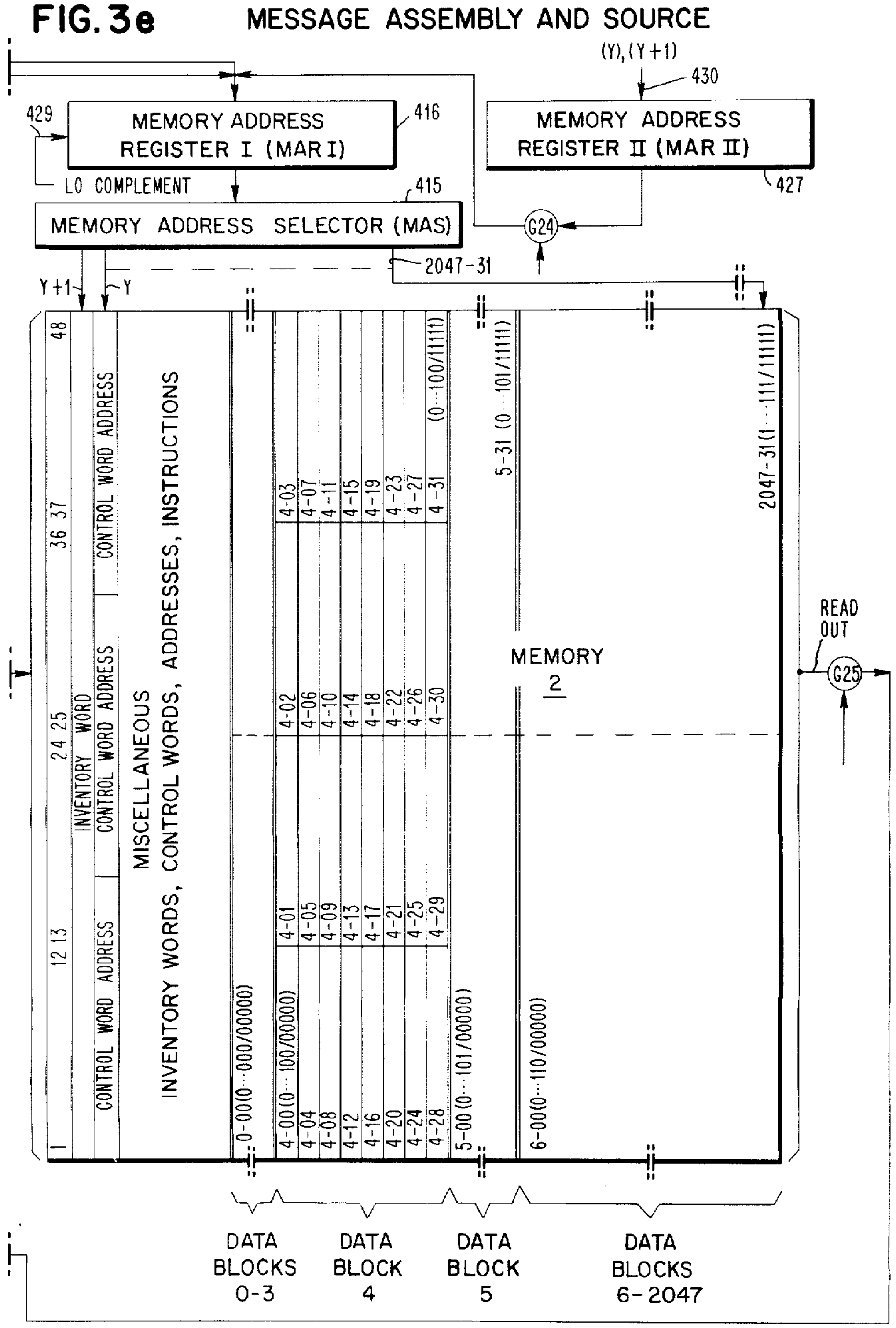

March 15, 1966 R. M. TOMASULO ETAL 3,241,125
MEMORY ALLOCATION
Filed May 22, 1962 14 Sheets-Sheet 12
FIG. 5b ASSEMBLE CHARACTERS
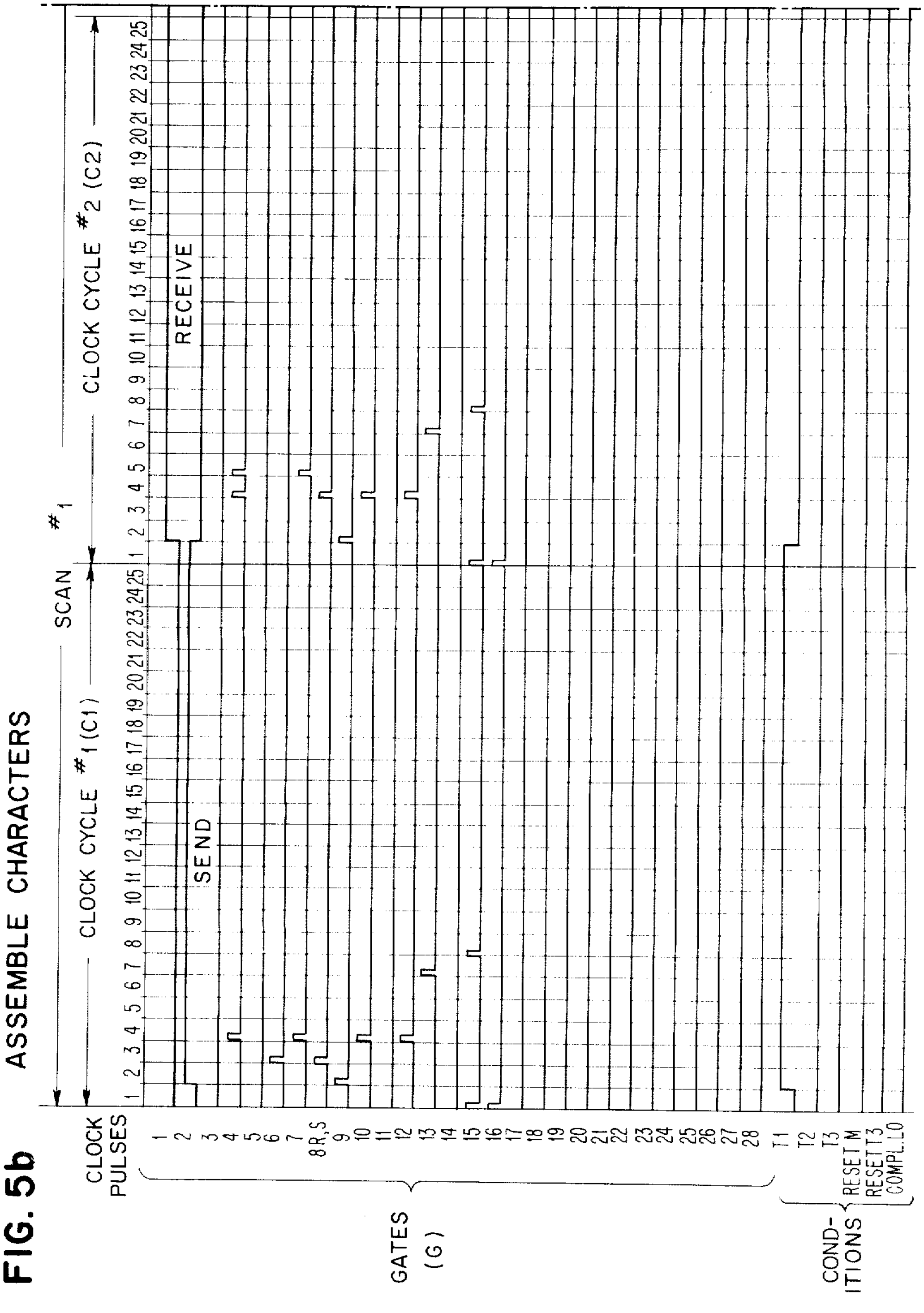

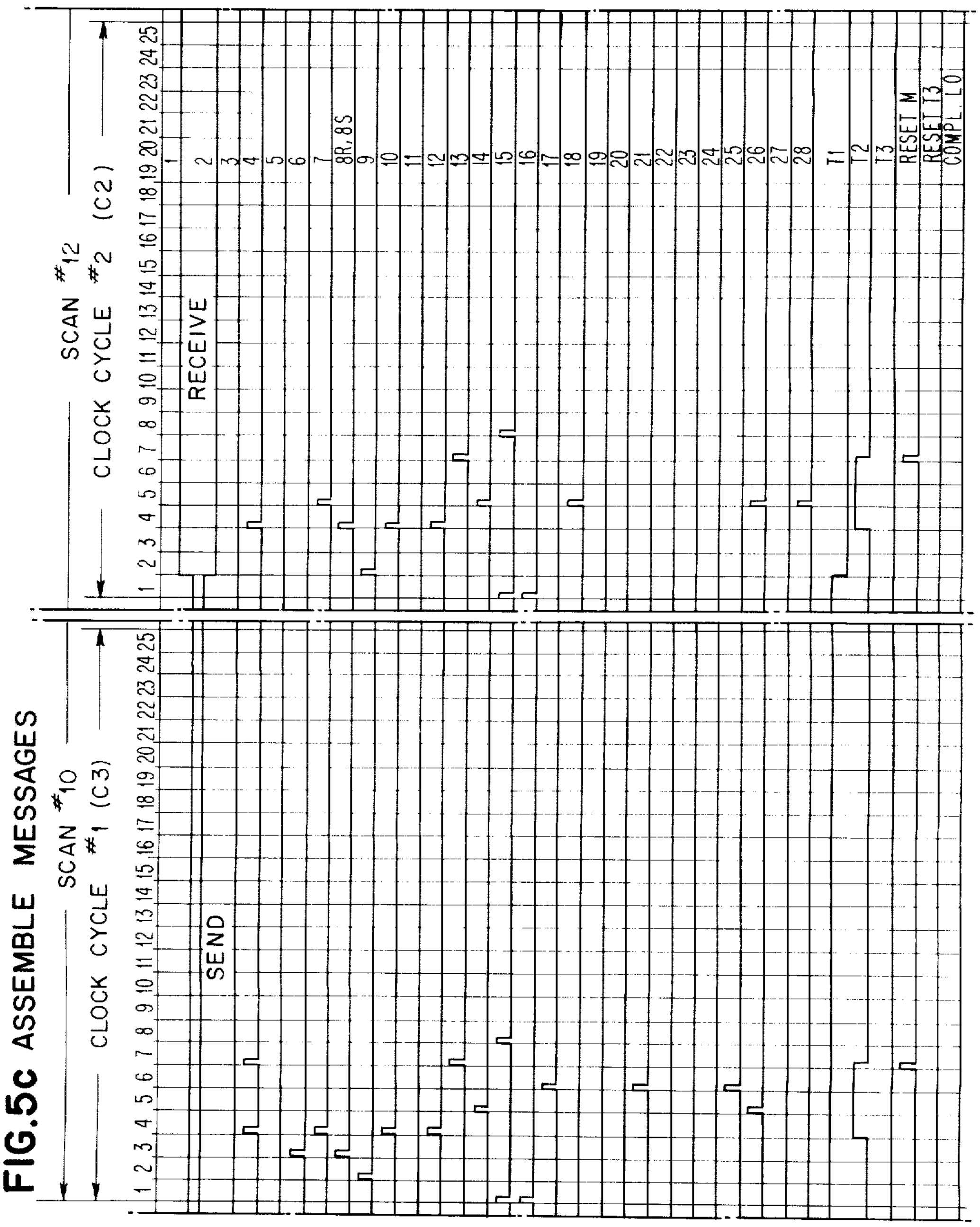
FIG.5c ASSEMBLE MESSAGES

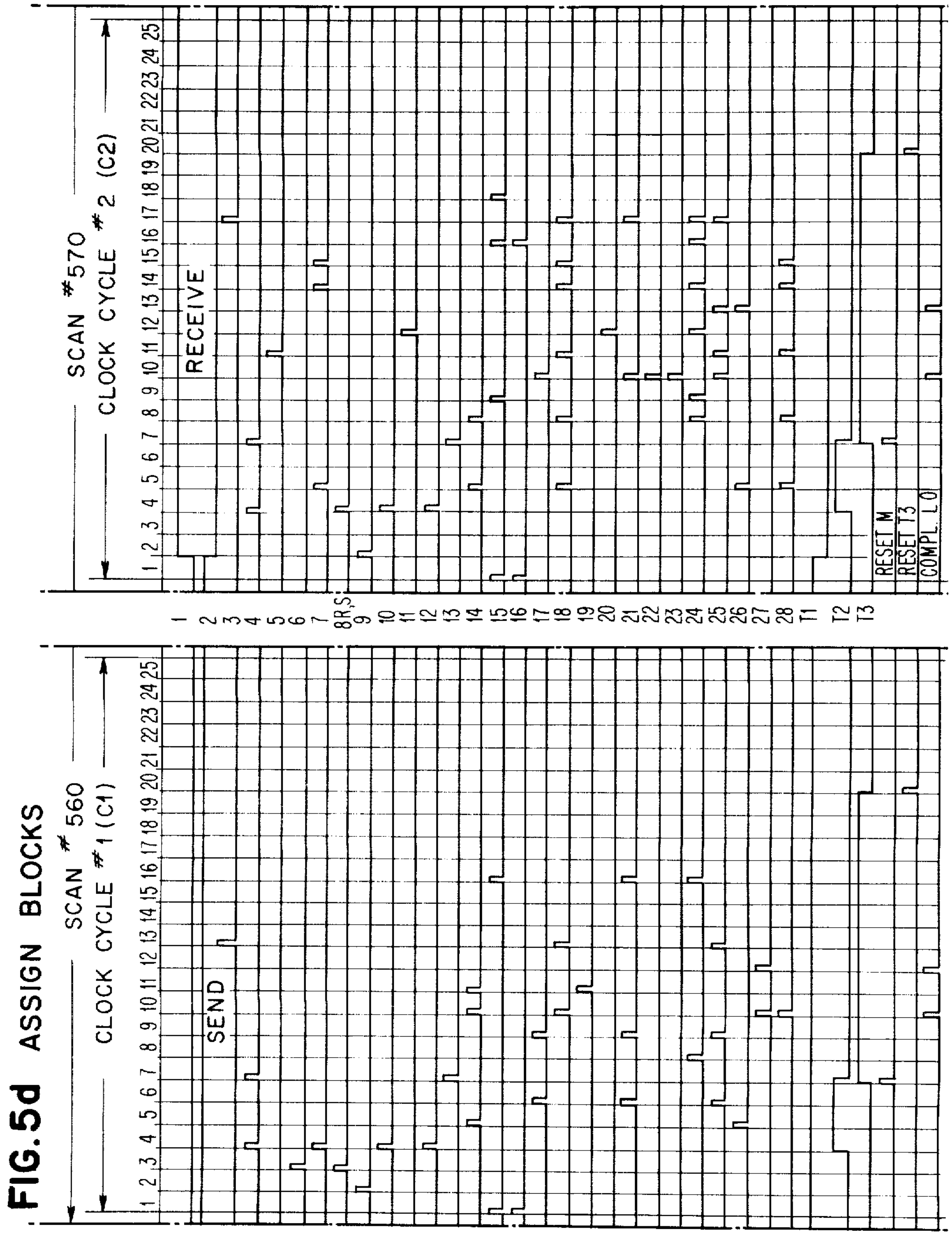
FIG. 5d ASSIGN BLOCKS

United States Patent Office
3,241,125
Patented Mar. 15, 1966

3,241,125
MEMORY ALLOCATION

Robert M. Tomasulo, Staatsburg, and James R. Kersey, Poughkeepsie, N.Y., Frederick M. Trapnell, Jr., Hursley Park, Winchester, England, and Roy Wiig, White Plains, N.Y., assignors to International Business Machines Corporation, New York, N.Y., a corporation of New York Filed May 22, 1962, Ser. No. 196,671
23 Claims. (Cl. 340—172.5)

This invention relates to electronic apparatus. In particular, this invention relates to apparatus for automatically maintaining an inventory of free memory locations.

As is well known, electronic storage devices, known as memories, may hold information at addressable locations. Access is gained to each location, in order to enter (write) new information or remove (read) stored information, by specifying the address of the location to which access is desired. The amount of information that may be stored in a memory is limited by the physical size of the device. Since the cost of a memory is a function of its size, it is essential that economical use be made of all available storage locations. This means that, in some way, an accurate inventory must be kept of locations in which information may be stored. Otherwise, if the entry of information is not to be delayed, additional storage space must (at extra cost) be provided.

Therefore, it is obvious that given a fixed memory size efficient use of the memory requires an accurate knowledge of which locations are free and which are full. In prior art programmed data processors, the programmer is responsible for keeping an accurate inventory of memory use. For example, in a code conversion problem where, by program, the computer must convert one million teletypewriter-code character into one million binary-coded decimal characters the programmer must carefully allocate sections of the memory to the controlling program, other sections to blocks of incoming teletypewriter characters and still other sections to outgoing binary-coded decimal characters. If the memory has only 100,000 locations, then a major portion of the programmer's work is to allocate memory locations to proper sections as the locations become available. In the typical prior art computer, the allocation must be manually by the programmer before computation can start. This is especially difficult in the case where incoming data arrives at random times. For instance, if the programmer is not able to predict exactly when incoming teletypewriter characters will arrive at the computer, he will have to write a program that is in some way synchronized with the randomly arriving data.

In prior art devices of the type described in U.S. Patent No. 2,974,866, J. A. Haddad et al., "Electronic Data Processing Machine" issued March 14, 1961 on application Serial No. 419,642 filed March 30, 1954 and U.S. Patent No. 2,850,234, J. E. Bartelt et al., "Magnetic Record Input-Output Device for Calculators," issued September 2, 1958, on application Serial No. 401,648 filed December 31, 1953, both assigned to the International Business Machines Corporation, this could be accomplished by the use of conditional transfer instructions, which permitted the programmer to direct the computer to take one course if incoming data was available and another course if it was not. In this way the programmer could draft a program which filled one section of memory with incoming information when available while another previously filled section was operated upon by the computer. This scheme, however, though permitting some flexibility still required the programmer to keep careful track of section allocation and did not permit efficient utilization of all empty locations.

An improvement over the scheme just described is disclosed in C. L. Christiansen et al. "Data Synchronizer," application Serial No. 705,447, filed Dec. 26, 1957, assigned to the International Business Machines Corporation. This permits the programmer to specify a number of empty memory sections which are automatically filled by incoming data under the control of an input program separate from the computation program. Whenever an entire section is filled, a prespecified empty section is called in. Though convenient for the programmer, this scheme is limited to automatically allocating only prespecified empty sections. The programmer still has to keep careful track of empty sections to insure their efficient allocation.

Another approach found in the prior art is described in U.S. Patent No. 2,968,791, E. L. Johnson et al., "Buffer Storage System," issued January 17, 1961, on application Serial No. 586,247 filed May 4, 1956, assigned to the International Business Machines Corporation, wherein there is provided apparatus for indicating which locations in a storage device are full and which are empty. When incoming information is available, it is automatically entered into an empty location. In this way every empty location is automatically utilized. Further, this efficiency is achieved without requiring previous work by the programmer. However, if unique groups of incoming information (such as messages comprising several teletypewriter characters) are being received, it may be difficult to recognize in which location a group, started in another location, is continued. One prior art solution to this particular problem is to "chain" memory sections together by using the last location in each section to indicate the first location of the section in which the incoming information is continued.

In summary, the prior art teaches the efficient use of empty memory locations by chaining together memory sections as filled, empty locations being allocated to the chain by either specifying them all ahead of time or by randomly choosing them from among the empty ones. The first scheme, where the chain is fixed ahead of time, has the sohrtcoming of being too rigid and not capable of accommodating changes that may occur during use. For example, if some sections are specified for one incoming line, and other sections are specified for another incoming line, one group of sections will be entirely lost to the system if the associated line is not used. Further, a complicated program is required to reallocate sections to lines when the sections become empty. The second scheme, where empty locations are chosen in random order, in effect permits all empty locations to be regarded as a pool of locations which may be allocated to any section. Therefore, the non-use of an incoming line does not affect the efficient use of empty locations, none being assigned to that line until needed. A shortcoming of this second scheme is that a time-consuming search must be conducted for each empty location before use. This is especially difficult if modern random access (as opposed to sequential access) core-storage devices are used.

It is therefore an object of this invention to provide cheap apparatus combining the advantages of a fast fixed sequence prespecified assignment scheme and a flexible random assignment scheme.

It is another object of this invention to provide means for efficiently allocating available memory locations to utilization devices as required.

Another object is to make available to a queue of empty memory areas, areas originally allocated to output devices, which have been emptied.

Still another object is to pool empty memory locations for use by input devices as needed without searching.

A still further object is to provide apparatus wherein empty memory locations are removed in order from a queue of empty location designations as needed, and wherein newly emptied locations are added to the queue.

An additional object is to provide means for assigning, to a plurality of inputs, empty memory locations from a queue of all available empty memory locations and for assigning to said queue empty memory locations freed by any of a plurality of outputs.

Another object is to provide novel apparatus for chaining a plurality of memory locations into a queue.

The foregoing and other objects, features and advantages of the invention will be apparent from the following more particular description of a preferred embodiment of the invention, as illustrated in the accompanying drawings.

These objects are achieved, in one embodiment of the invention, by apparatus including a plurality of input/output lines, character assembly means for each line, a memory having a plurality of empty message assembly sections allocatable to said lines as needed, and means for holding an inventory word for designating the beginning and the end of a queue of available empty locations in said memory. For purposes of explanation it is convenient to picture information entering and leaving on the input/output lines as serial signals (bits), groups of which form characters of information. A message comprises a plurality of characters. The serially received bits are assembled into character groups in a character assembler and are then forwarded to successive locations in empty message assembly sections (or areas or blocks) of the memory. Each memory section comprises a plurality of locations, each location being capable of storing a number (one, in this simplified example) character. The last character location in each memory section is used to store a designation indicating the location of the beginning location of some other memory section. Initially all empty memory sections to be used for message assembly are chained together (or pooled) into a queue in any convenient sequence, the last location of each section specifying the next empty memory location.

Each input/output line is assigned a message assembly area for assembling incoming messages, or as a source for outgoing messages. During output, when a message portion stored in a memory section is sent out on a line, a designation of the newly emptied section is added to the end of the queue. Therefore, a current inventory of all available empty sections is maintained for the common use of all lines during both input and output. A designation of the current first memory section in the queue is indicated in one portion of an inventory word, and a designation of the current last memory section in the queue is placed in another portion of the inventory word. Each time that an empty section is needed by an input line for message assembly, the first memory section in the queue indicated by the inventory word is assigned to the line. The chaining character at the end of the newly assigned section replaces the first memory section designation in the inventory word, since it indicates the next empty available section in the queue. A designation of the first location in the newly assigned section is placed in the last location of the previous section allotted to the input line, so as to indicate where the input message is continued. Whenever a newly emptied memory section (its contents having been sent on an output line) becomes available, a designation of its location is placed in the inventory word last memory section portion, and also in the last character location of the memory section indicated by the inventory word portion being replaced. In this way the queue is extended and its new end is indicated.

In summary, the inventory word keeps track of the beginning and end of a chain of empty memory sections available for message assembly as needed. Empty sections are removed from the beginning of the chain as needed, and are added to the end of the chain as available. The inventory word is adjusted to always indicate the limits of the chain. The words "queue," "pool" and "chain" describe the empty memory sections (or "areas" or "blocks") available for allocation (or "assignment" or "allotment") to input lines.

In the figures:

FIG. 1*a* is a block diagram showing the general structure of apparatus embodying the invention.

FIG. 1*b* is a table showing the allocation of blocks in the structure of FIG. 1*a*.

FIGS. 2*a*, 2*b*, and 2*c* are tables showing an example of operation of the apparatus of FIG. 1*a*.

FIGS. 3*a*, 3*b*, 3*c*, 3*d*, and 3*e*, when arranged as shown in FIG. 3*f*, together form a logic diagram showing in more detail the structure of the invention embodied in the apparatus of FIG. 1*a*.

FIGS. 4*a* and 4*b* are logic diagrams showing the control circuitry necessary to operate the structure shown in FIGS. 3*a*–3*f*.

FIGS. 5*a*, 5*b*, 5*c*, and 5*d* are pulse diagrams of signals present during operation of the structure shown in FIGS. 3*a*–3*f*.

GENERAL DESCRIPTION

*Structure.*—Referring first to FIG. 1*a*, there is shown a block diagram illustrating apparatus embodying the invention. Information is received and transmitted on a plurality of lines (01, 02, etc., through 100). This information may, as an example, be viewed as comprising serially received signals each representing a bit of information. Groups of bits are called characters and groups of characters are called messages. Lines 01 and 100 are shown transmitting or sending information outward towards terminal units not shown. Lines 02 and 03 are shown receiving information from terminal units not shown. Any number of terminal units may be connected to one line. For purposes of explanation, it is assumed here that each line is connected to one terminal unit only. There are shown 100 lines connecting to 100 terminal units, though any number of lines may be used.

The scanner 4 connects the lines to a common bus 5, the scanning action, represented by the movement of the wiper 6 among the lines, resulting in the assignment of a particular time slot on the bus 5 to each of the lines. The wiper 7 moves in synchronism with the wiper 6, as expressed by the dashed line 8 so that during time slot 1 line 01 is connected to terminal 9, during time slot 2 line 02 is connected to terminal 10, etc., until at time slot 100 line 100 is connected to terminal 108. A "scan" is therefore defined as the period during which every line is contacted. Each line is contacted at the same time during each scan. The information on the lines is, however, completely independent of the scanner (except that the scanner must be fast enough to contact every line without losing incoming information). The scanner 4 is shown as an electromechanical device for purposes of functional description only, it being usual to use an electronic scanner. The scanner 4 may be entirely dispensed with if each of the lines is connected to the corresponding one of the terminals 9, 10, etc.

The character assembly and source storage device 3 is shown in FIG. 1*a* as comprising a number of character sections equal to the number of lines. The character locations may be used as either source or assembly locations dependent upon the operation of the associated lines. Since any line may be used for either purpose, any character location may be used as either an assembly location or a source location. The character assembly and source 3 is shown as having an input or output connection to the scanner for each character location. This is a simplification not often used in modern storage devices such as random access core magnetic core stores. If, however, the character assembly and source 3 is viewed as having each of its character locations accessed in sequence at the same time that a line is sequentially scanned, then the effect is the same as having each line connected to its associated character location at given (but not all) times. Received characters arrive from the scanner serially by bit so that for receiving purposes character locations are used to assemble characters. When a sufficient number of bits have been received to constitute a single character, the character location is said to be "full." In sending information to the scanner a character location acting as a source is filled with a character which is then emptied from the character location bit by bit on to the corresponding line through the scanner 4. Whenever a character location used for assembly becomes filled, it will request that its contents be emptied via its associated output by its associated one of the terminals 209, 210, etc., through 308. When a character location used as a source becomes empty it requests a new character on the associated one of the terminals 209, 210, etc., through 308. The wiper 309 moves to one of the requesting terminals at a time to service it, that is, remove a character from a filled character location or supplying a new character to fill an empty location. The wiper 309, which is symbolic only, is operated by means of control exerted through the dashed line 310. The significance of the current block address fields 109, 110, etc., through 208 will be explained below.

The message assembly and source memory 2 may be of construction similar to the character assembly and source 3. Its function is to either assemble into messages characters received from the character assembly and source 3 or to act as a source of characters for the character assembly and source 3. Access is gained to locations (of which 2048 are shown, though any number may be provided) by means of the wiper 311 symbolically controlled by the dashed line 312. Each group of locations in the message assembly and source 2 is called a section or a block. Each block is shown as comprising 5 characters plus a block control character (of which block control character 400 is typical) though any number of characters may be provided. Each time that a character location in the character assembly and source 3 is filled, that location will eventually be emptied into one of the blocks in the message and assembly source 2. Subsequent characters entered into the same character location of the character assembly and source 3 will be sent to the same block in the message assembly and source 2. When a block in the message assembly and source 2 is filled, and more characters arrive from the character assembly and source 3, message assembly will be continued in another block, the address of which will be indicated in the block control character of the filled block, thus "chaining" together the blocks in which a single message is assembled. If a block in the message assembly and source 2 is acting as a source of a message, the message will be stored in a plurality of blocks arranged in a chain. The beginning of the message will be in one block and it will be continued into other blocks, the block control character in each block indicating the location of the next block in the chain. Whenever the character location in the character assembly and source 3 associated with the message becomes empty, a character from the message will be sent from the message assembly and source 2.

The current block address field (for example 109) associated with each character location in the character assembly and source 3 indicates the block in the message assembly and source 2 in which characters received from the corresponding line being assembled into message or from which characters transmitted on the corresponding line are supplied. In addition, each current block address field specifies the location in the indicated block to which, or from which, the character is communicated. For example, the line 01 character location in the character assembly and source 3 indicates that the next character is to be obtained from block 4 in the message assembly and source 2. The location in block 4 from which the character is to be obtained is specified by the current block address field also, but for simplicity this feature will not be discussed until the detailed description below.

An inventory word 1 comprising a next block field and an end block field is shown as associated with the character assembly and source 3 and the message assembly and source 2 via the line 313. The inventory word may be a separate register or it may be a location in the message assembly and source 2. The next block field of the inventory word 1 contains an address used to indicate a block which is empty and free to be used for storing message parts. The end block field of the inventory word 1 is used to store the designation of the last empty available block in the message assembly and source 2. As will be explained, the two fields in the inventory word 1 indicate the beginning and end of a chain of empty blocks in the message assembly and source 2, the chain being constructed by utilizing the block control characters in all blocks (except the last) to indicate the next block in the chain.

Referring to FIG. 1*b*, the use of the current block address in the character assembly and source 3, the block control characters in the message assembly and source 2 and the inventory word will now be explained. As was previously stated, lines 01 and 100 are message transmitters sending messages outward to their associated terminals and lines 02 and 03 receive messages from their associated terminals. The message being sent outward on line 01 is stored in the message assembly and source 2 in blocks 4, 12, 5 and 11. Referring to the block control character of block 4 in the message assembly and source 2 it can be seen that it refers to block 12. Referring to the block control character of block 12 it is seen that it refers to block 5. Referring to block 5, its block control character refers to block 11. Referring to block 11 it is seen that there is an "X" in its block control character indicating an end of message, though this is not essential. Since the current block address field for line 01 initially indicates block 4, the message contained in blocks 4, 12, 5 and 11 will be sent out on the line 01, characters being removed from the blocks one at a time and sent to the character assembly and source 3 location corresponding to line 01. After the first five characters have been sent from block 4, the block 4 block control character (12) will be placed in the line 01 current block address field one, the next five characters will be sent from block 12. This continues until the end of message mark is reached.

Simultaneously, line 100 will be transmitting a message found in blocks 8, 10 and 22 of the message assembly and source 2. The transmission of this message is identical to that just described for the transmission of a message on line 01 with the exception that the character location corresponding to line 100 in the character assembly and source 3 is used.

Line 02 is initially assigned to block 0 for the assembly of characters (by placing a 0 in the associated current block address) into a message and line 03 is initially assigned to block 7 (by placing a 7 in the associated current block address) for the assembly of characters into another message. When five characters have been received from one of these lines, another block will have to be assigned to that line. The block control character associated with the filled block is not used for this purpose. Rather, an empty block, from a pool of blocks, will be assigned.

A pool, or queue, of empty blocks is arranged in the message assembly and source 2 into a *chain comprising* blocks 2, 13, 1, 3, 9 and 6. Referring to the message assembly and source 2 it can be seen that the block control character of block 2 refers to block 13. The empty chain continues until block 6 is reached (a block control character of this block indicating by means of an "X" that it is the end of the chain, though this is not essential).

Referring to the inventory word 1 it can be seen now that the next block field initially indicates the beginning (2) of the empty chain, and the end block field initially indicates the end (6) of the empty chain. As blocks are needed for message assembly for lines 02 and 03, they will be assigned in order, starting with the next block (2) initially indicated in the inventory word. It cannot be predicted which line will receive which block since the first line to be given service is the first to get an empty block. A block is assigned to a line by placing its number (from the inventory word next block field) in the line current block address field, and also into the block control character of the block previously used by the line. The inventory word is then made to reflect this assignment by placing the block control character of the assigned block in the next block field. As lines 01 and 100 release blocks by emptying them, these newly emptied blocks are assigned to the end of the queue thus extending the empty chain past the previous end block (6). This extension is accomplished by placing the number of the newly emptied block into the block control character of the previous last block (indicated by the inventory word end block field). The inventory word end block field is then made to reflect this extension by placing the number of the newly emptied block in the end block field.

The following table summarizes the operation of the apparatus during allocation of binary sections from, and to, the empty chain. The order of operation is not essential.

TABLE

*Sending*

ASSIGNMENT OF EMPTIED BLOCK (X) TO QUEUE (1) Place address of X into Block Control Character (BCC) of the block (indicated by the inventory word) currently at the end of the queue, thus extending the queue.

(2) Place the address indicated by the BCC of the block X into the block address field of the line control word, thus indicating where the next portion of the outgoing message is to be found.

(3) Place address of X into the inventory word, thus adjusting it to reflect the extension of the queue.

*Receiving*

ASSIGNMENT OF EMPTY BLOCK (Y) TO A LINE (1) Place address of Y (indicated by the inventory word) into BCC of the block currently used by the line, thus indicating where the balance of the incoming message is assembled.

(2) Place address of Y (indicated by the inventory word) into the block address field of the line control word, thus indicating where the next portion of the incoming message is to be assembled.

(3) Place the address indicated by the BCC of the block Y into the inventory word, thus adjusting the inventory word to reflect the shortening of the queue.

GENERAL OPERATION

*Sending.*—Referring now to FIG. 2*a* the operation of the apparatus of FIG. 1*a* during sending of messages on lines 01 and 100 will be explained. The message "jewel in an Ethiop's ear" (with spaces indicated by the blank character *b*1) is stored in blocks 4, 12, 5 and 11 of which only the part in blocks 4 and 12 is shown in FIG. 2*a*. The message which starts in block 4 with the characters "jewel" is continued (referring to the block control character of block 4) in block 12. The message "beware yon Cassius" to be sent on line 100 is stored in blocks 8, 10 and 22 of which the part in blocks 8 and 10 is shown in FIG. 2*a*. The message starts in block 8 and is continued in block 10 as can be seen with reference to the block control character of block 8. The "scan" numbers refer to the number of times that all 100 lines have been sensed by the scanner.

During successive scans of the lines 01 through 100 in FIG. 1*a*, characters of the message will be moved from blocks in the message assembly and source 2 to the character assembly and source 3 character locations from where they are sent one bit at a time into the corresponding line. For example, the first character (j) of the message starting in block 4, is sent to the character source for line 01 during scan #10. During the subsequent 200 scans of the line 01, the bits comprising the letter "j" will be transmitted. One bit is not necessarily transmitted at the time of each scan since the scan rate need not be related to the bit transmission rate. The block (4) which has supplied a character to the line 01 character source of the character assembly and source 3 is indicated in the current block address field of that character location. When the character "j' has been completely transmitted to the line 01, a request for another character from this same block will be made. Thus, at the time of the 210th scan the character "e" will be sent from block 4 in the message assembly and source 2 to the character assembly and source 3 line 01 character location. This will continue for successive characters transmitted on line 01 until, on scan #560, the last character (l) in block 4 will have been sent to the character assembly and source 3. When, at scan #600, the character source of the character assembly and source 3 for line 01 requires another character it will be obtained not from block 4 but rather from the block indicated in the block control character of block 4, which block is block 12. The current block address field associated with the line 01 character source will be updated to indicate the block (12) from which the next group of characters will be obtained.

Line 100 actively transmits a message from blocks 8, 10 and 22 at the same time as line 01 transmits its message from blocks 4, 12, 5 and 11. In FIG. 2*a* this operation is shown as occurring during cycles alternating with the cycles during which transfer of characters onto line 01 occurs. This is shown for purposes of simplicity only, since the transmission times of characters onto the lines 01 and 100 are completely unrelated, except that during any one scan line 01 is given priority over line 100 since each scan starts at line 01 and ends at line 100. For example, at scan #320 both line 01 and line 100 require a character to be sent from a block in the message assembly and source 2 to the character assembly and source 3. It will be seen that a character (w) is first sent from block 4 to the line 01 character location and that during the same scan a character (w) is afterward sent from the block 8 to the line 100 character location.

The end of the empty chain as indicated by the inventory word 1 end block field is initially 6. As has been explained with reference to scan #560, the message being sent on line 01 initially starts in block 4 and is continued in block 12. The block control character (12) of the block 4 is placed in the line 01 current block address field. Block 4 is therefore no longer needed by line 01 after scan #560, its contents having been fully transmitted. Block 4 is thus assigned to the end of the empty chain by placing the number 4 in the block control character of the previous end block (block 6) and updating the inventory word by placing the number 4 into the end block field of the inventory word 1. At scan #585 block 8 becomes available, the contents of this block having been entirely transmitted on line 100. The line 100 current block address is set to the block 8 block control character (10) so that the next character (e) of the message will be supplied from the proper block (10). The block control character of the previous end block (block 4) is replaced with the number 8 to add the newly available block (8) to the empty chain and the end block field of the inventory 1 is set to the number 8 to indicate the new end of the empty chain. It can be seen from FIG. 2*a* that at the scan #950 block 12 becomes available and at scan #970 block 10 becomes available, the inventory word 1 end block field being in each case updated to reflect the assigned newly emptied blocks to the end of the empty chain. Thereafter, whenever a block becomes available, because its contents have been transmitted to a terminal unit, the block is assigned to the end of the empty chain by updating the inventory word 1 in the end block and by adjusting the block control character of the block previously indicated by the end block field. In this way the pool of empty blocks is made to grow by placing at the end of the queue empty blocks as they become available.

*Receiving.*—Referring to FIG. 2*b* the operation of the device of FIG. 1*a* in receiving messages will be briefly described. Line 02 receives the message "the base rungs by which" which is assembled in block 0 initially and thereafter in whichever blocks are assigned from the empty pool. Line 03 receives the message "what fools these mortals," which message is assembled initially in block 7 and is thereafter continued in whatever blocks are made available from the empty chain. Characters as they are received are placed into the appropriate character location in the character and assembly source 3. Whenever a character location is filled the character is transferred to the assigned block (indicated in the associated block address field of the character assembly and source 3) in the message assembly and source 2. For example, at scan #12, the character "*t*" is transferred from the line 02 character location to block 0, as indicated by the line 02 current block address. At scan #570 the 5th character "b" is transferred from line 02 to the block 0. At this time another block will be necessary to continue the message. The block indicated in the block control character of block 0 is not the block in which the message will be continued. The message will be continued in the block (2) indicated in the next block field of the inventory block 1 so that, at scan #610, the next character "a" will be transferred from line 02 to the block 2, the line 02 current block address field being set to 2. Block 2 having been removed from the empty chain, the next block (block 13) in the chain as indicated in the block control character of block 2 will be available for allocation when needed. The inventory word 1 in the next block field will be updated to reflect this by placing the number 13 in the next block field of the inventory word 1.

At scan #580 the character "*b1*" will be entered from the line 03 character location into block 7 completely filling that block. Again a block must be assigned from the empty chain. This is block 13 indicated in the next block field of the inventory word 1. The line 03 current block address field is set to 13 and, as a result, at scan #612 the next character ("f") will be transferred from the line 03 character location to block 13. Since block 13 has been allocated to line 03, the next block (block 1) in the chain, as indicated by the block control character of block 13, is the next one to be allocated when needed. The inventory word 1 in the next block field is changed to indicate that the next block available is block 1. At scan #950, line 02 will have completely filled block 2. At this time block 1 will be assigned to line 02 and the next block in the sequence (block 3) indicated by the block control character of block 1 will be designated in the inventory word 1 next block field. At scan #965, line 03 will have completely filled block 13. Therefore the next block indicated by the next block field of the inventory block 1, which is block 3, will be assigned to line 03. The next block field of the inventory word 1 will be set to indicate the new beginning of the empty chain which is the block (9) indicated by the block control character of the previously assigned block 3. As lines require additional blocks for the assembly of a message associated with that line, blocks are assigned in accordance with the next block field of the inventory word 1.

Characters have been shown as being transferred from the character locations of lines 02 and 03 to the blocks in alternate sequence. This is not essential, being shown only to simplify the explanation. This sequence is followed only if during one scan more than one line requires a transfer. Then, transfer will be made in the order of scan. For example, during the scan #320, line 02 is given preference over line 03 in the transfer of characters from the character assembly and source 3 to the message assembly and source 2.

*Send/Receive.*—FIG. 2*c* illustrates the operation of the apparatus shown in FIG. 1*a*, combining the operations which were segregated into FIGS. 2*a* and 2*b* for convenience. The operation of the apparatus of FIG. 1*a* for the block allotment shown in FIG. 1*b* will now be described with reference to FIG. 2*c*. The scan numbers refer to the number of times that a particular line and a particular line character location in the character assembly and source 3 has been scanned by the scanner 4. The order of scan is line 01, 02, etc., through 100. When line 100 has been scanned, the scan repeats starting with line 01 again. The messages transmitted on lines 01 and 100 are the same as have just been described with reference to FIG. 2*a*. The messages received from lines 02 and 03 are the same as have just been described with reference to FIG. 2*b*. The initial allotment of blocks to the lines 01, 02, 03 and 100 is as previously described with reference to FIG. 1*b*. The empty chain is initially as previously described with reference to FIG. 1*b*. The other lines, not mentioned, may be either receiving or sending simultaneously using others of the 2048 blocks not described. The contents of the inventory word fields during each scan are shown at the bottom of FIG. 2*c*.

Prior to scan #10 bits are received on lines 02 and 03 and assembled into characters in the associated character locations of the character assembly and source 3. At scan #10 the first character (j) from block (4) indicated by the current block address field of the line 01 character location is placed into the line 01 character location in the character assembly and source 3. Subsequent to scan #10 the bits of this character (j) will be transmitted on line 01. At scan #15 the first character from the block (8) indicated by the current block address field of the line 100 character location will be placed into the line 100 character location of the character assembly and source 3. Therefore subsequent to scan #15 the transmission of bits on line 100 will commence. At scan #12 sufficient bits will have been received on line 02 to completely fill the line 02 character location (with a character "t") of the character assembly and source 3. This character (t) will be sent to the block (0) in the message assembly and source 2 indicated by the current block address field of the line 02 character location. At scan #13 the line 13 character location will be filled and the character (w) will be sent to the block (7) indicated by the current block address field of that character location. At scan #210 the line 01 character location will be empty and another character (e) must be obtained from the block (4) indicated by the current block address field of the line 100 character location. At scan #210 also the line 02 character location will be filled with a character (h) which is transferred to the block (0) indicated in the current block address field of the line 02 character location. This assembly and transmission of characters continues as just described through scan #550.

At scan #560 the character ("1") is transferred from block 4 to the line 01 character location, completely emptying block 4 which may now be assigned to the end of the queue indicated by the inventory word 1. This is done by adjusting the block control character of the current block (6) indicated by the end block field of the inventory word 1 to specify the new end block (4) in the chain. The end block field of the inventory word 1 is then changed to indicate that the new end block is block 4. The message being sent on line 01 is continued in the block (12) indicated by the block control character of the block (4) just assigned to the end of the queue. The current block address field of the line 01 character location is set to indicate that the next character is to be taken from block 12.

At scan #570 the line 02 character location transfers the character ("b") to the block (0) indicated by its current block address field, completely filling block 0. The balance of the message arriving on line 02 must now be continued in another block, which block is assigned from the empty chain. The next empty block (2) of the empty chain is indicated by the next block field of the inventory word 1. The address of this block (2) is placed into the current block address field of the line 02 to indicate that the next five characters of the message are to be placed into block 2. The next block (13) in the empty chain is indicated by the block control character of block 2, the inventory word 1 next block field being updated to specifiy that the next block is block 13. The address of the newly assigned block (2) is also placed into the block control character of the previous block (0) to indicate where the message is continued.

At scan #580 the line 03 character location transfers to the block (7) indicated by its current block address field a character (*b*1) which, being the fifth character sent to block 7, completely fills that block. The next available empty block (13) indicated by the next block field of the inventory word 1 is made available to line 03 by placing the number 13 into the current block address field of line 03 character location. The block 13 block control character is examined to determine the next block (1) in the empty chain, the inventory word 1 next block field being updated to indicate that the next block in the queue is block 1. The block control character of the filled block (7) is adjusted (to 13) to indicate where the message is continued.

At scan #585 the fifth character ("r") in block 8 is sent to the line 100 character location, thus emptying block 8. The balance of the message to be sent on line 100 is to be found in the block (10) indicated by the block control character of block 8. Therefore the number 10 is placed into the current block address field of the line 100 character location. Block 8 is no longer needed so that it may be assigned to the end of the empty chain. This is accomplished by placing the number 8 in the block control character of the current end block (4) indicated in the end block field of the inventory word 1 and by setting the end block field of the inventory word 1 to indicate that the new end block is block 8. The inventory word now reflects the addition of blocks 4 and 8 to the chain and the removal of blocks 2 and 13 from the chain. The inventory word remains unchanged from this time through scan #920.

At scan #950 the fifth character (a) in block 12 is transferred to the line 01 character location completely emptying that block and making it available for addition to the end of the chain. The block control character of block 12 indicates that the message is continued in block 5, the current block address of the line 01 character location therefore being updated to indicate that the subsequent characters of the message are to be obtained from block 5. Block 12 is then added to the end of the queue by placing its designation in the block control character of the previous end of the queue (block 8) indicated in the end block field of the inventory word 1. The end block field of the inventory word 1 is then changed to indicate the new end (block 12) of the chain.

At scan #950 also, the character (r) from the line 02 character location is sent to block (2) indicated by the current block address field completely filling that block. The next free block (1) indicated by the next block field of the inventory word 1 is assigned to line 02 for the continuation of message assembly by placing the number 1 in the current block address field of the line 02 character location. The empty chain is shortened by determining the next block (3) in the chain, indicated by the block control character of block 1, and placing this designation in the next block field of the inventory word 1. The block control character of the filled block (2) is adjusted (to 1) to indicate where the line 02 message is continued.

At scan #965 the character (s) from line 03 is transferred to the block (13) indicated by the current block address field of the line 03 character location, completely filling block 13. The next available block (block 3) indicated by the next block field of the inventory word 1 is allotted to line 03 by setting its current block address field to the number 3. Block 3 is removed from the empty chain by replacing its designation in the next block field of the inventory 1 by the number (9) indicated by its block control character. The address of block 3 is placed into the block control character of block 13 to indicate where the line 03 message is continued.

At scan #970 the character (n) is transferred from block 10 to the line 100 character location completely emptying that block. The block control character of block 10, which is 22, indicates that the message is continued in block 22. The current block address of the line 100 character location therefore is updated to indicate that the next five characters of the message are to be obtained from block 22. Block 10 is then added to the end of the empty chain by writing the number 10 into the block control character of the previous end of the chain (block 12) indicated by the end block field of the inventory word 1. The end block field of the inventory word 1 is then changed to the number 10.

The operation of the apparatus during subsequent scans will be obvious from the previous description, it not being thought necessary to repeat descriptions of these operations.

DETAILED DESCRIPTION

Figures 3A, 3F:
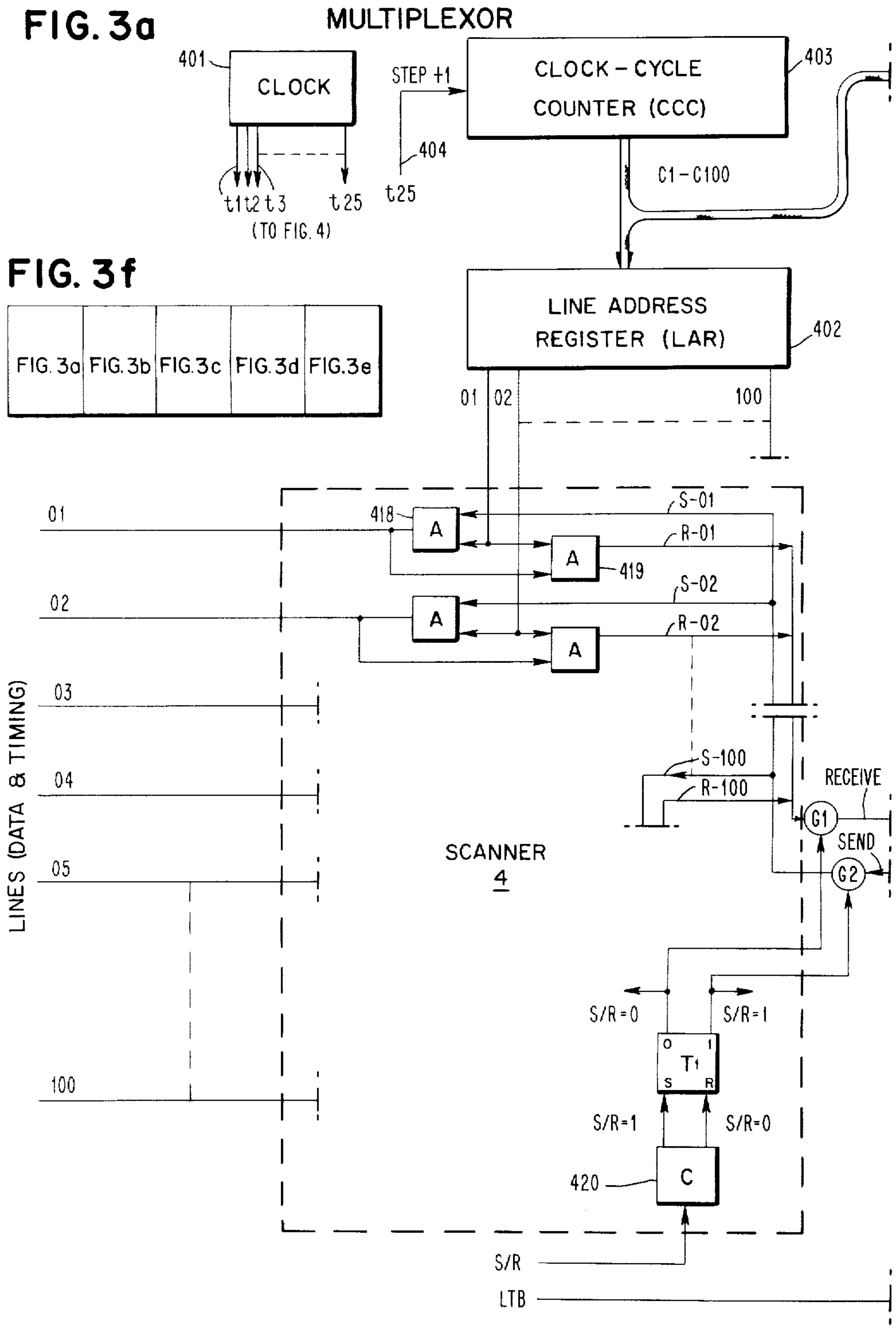
Figure 3B:
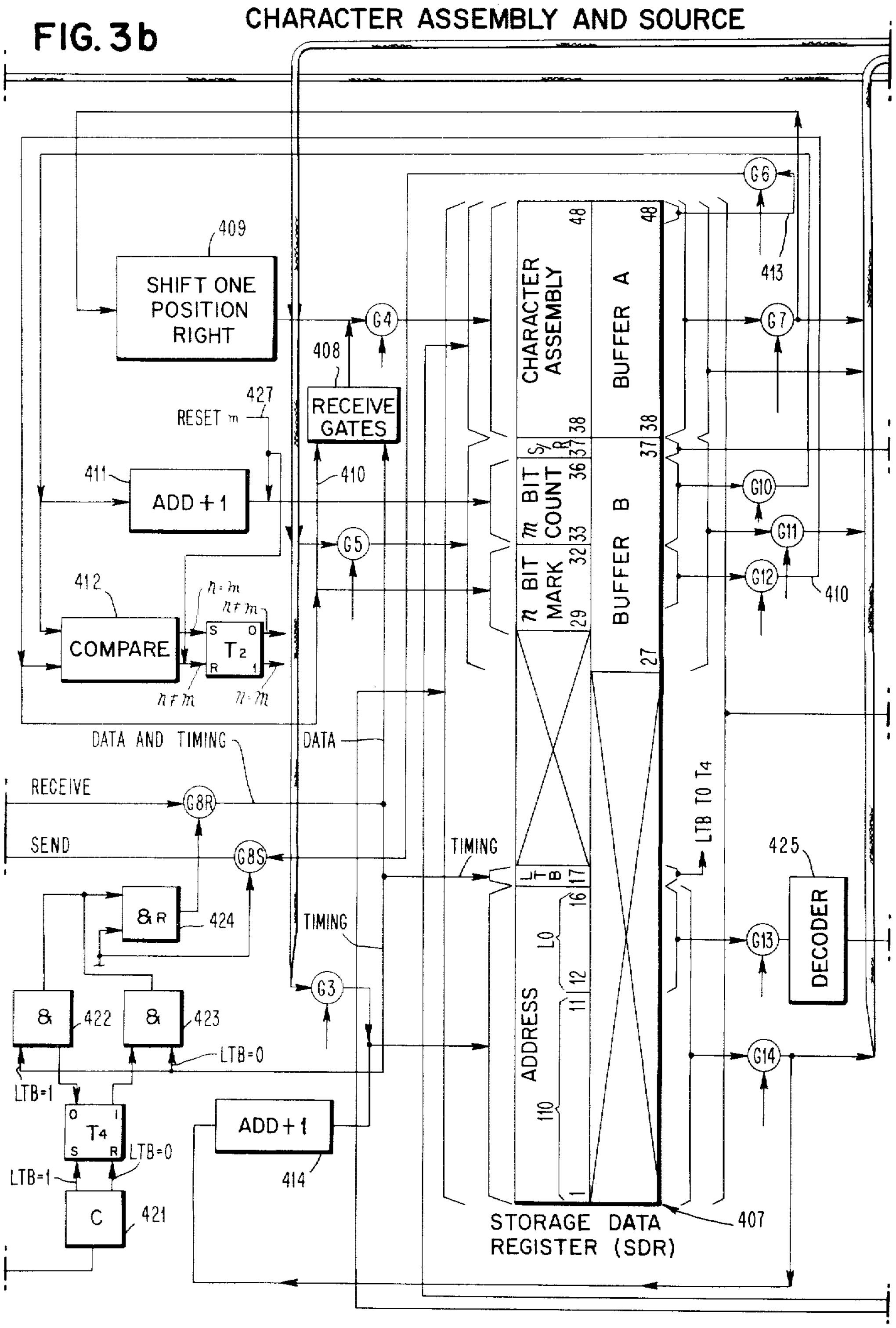
Figure 3C:
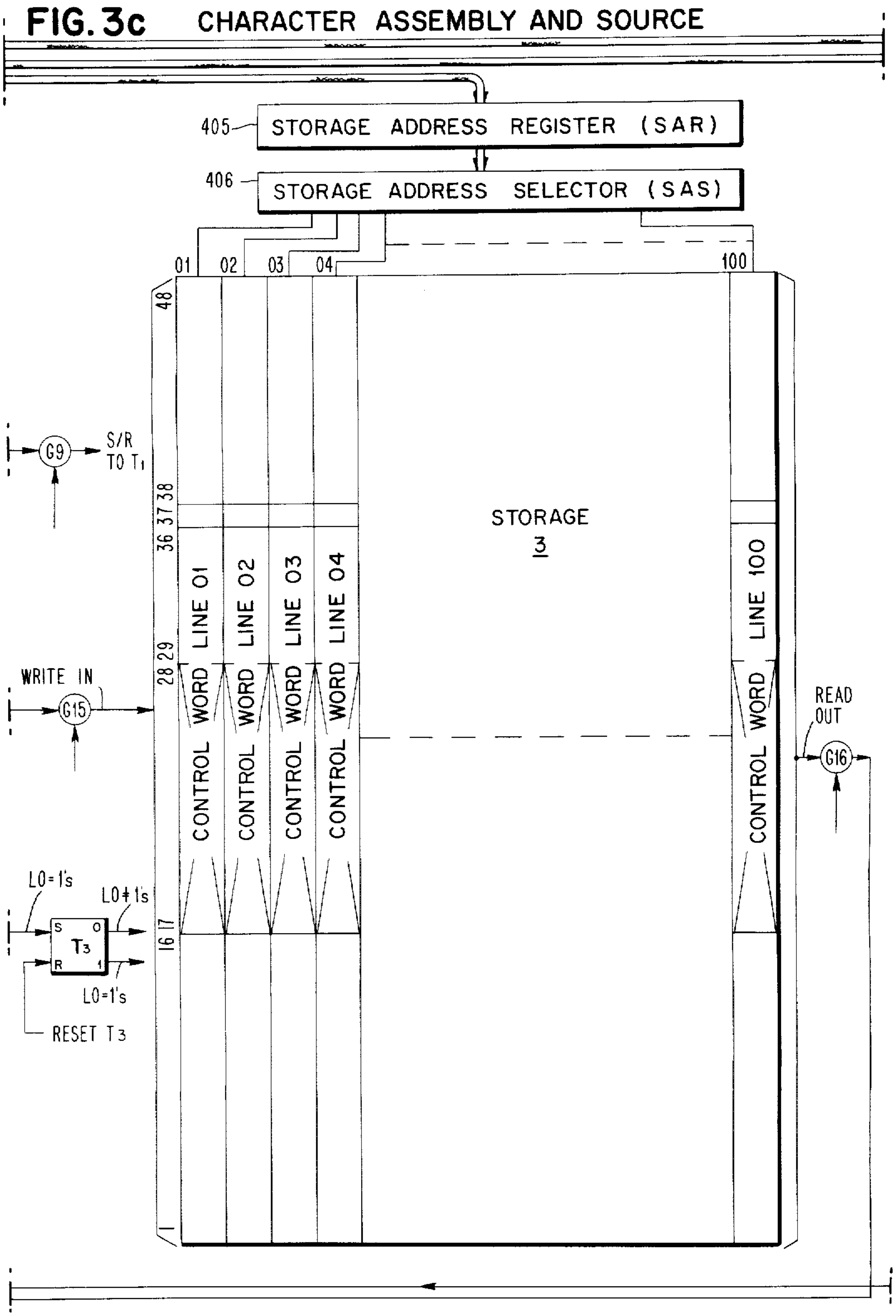
Figure 4A:
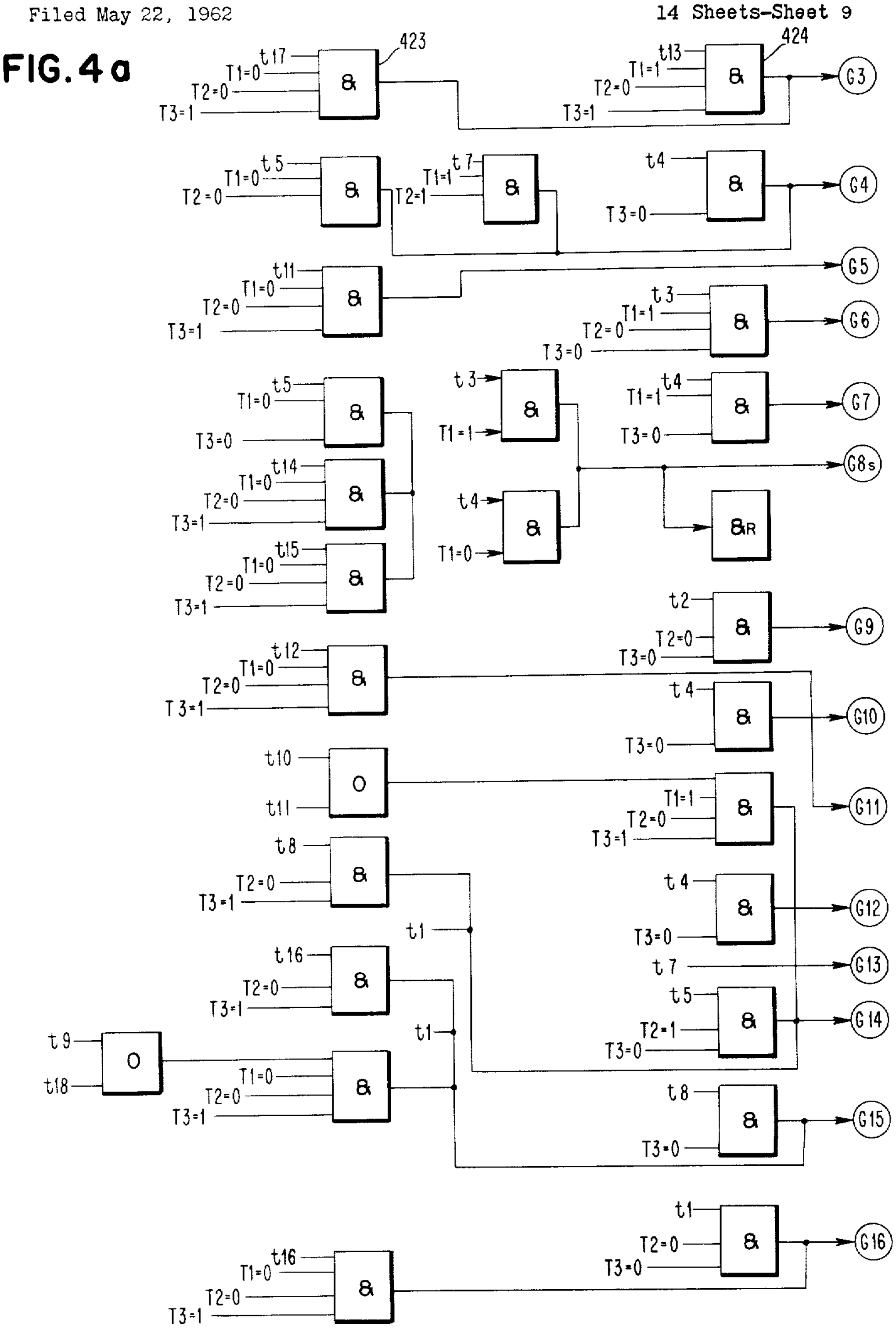
Figure 4B:
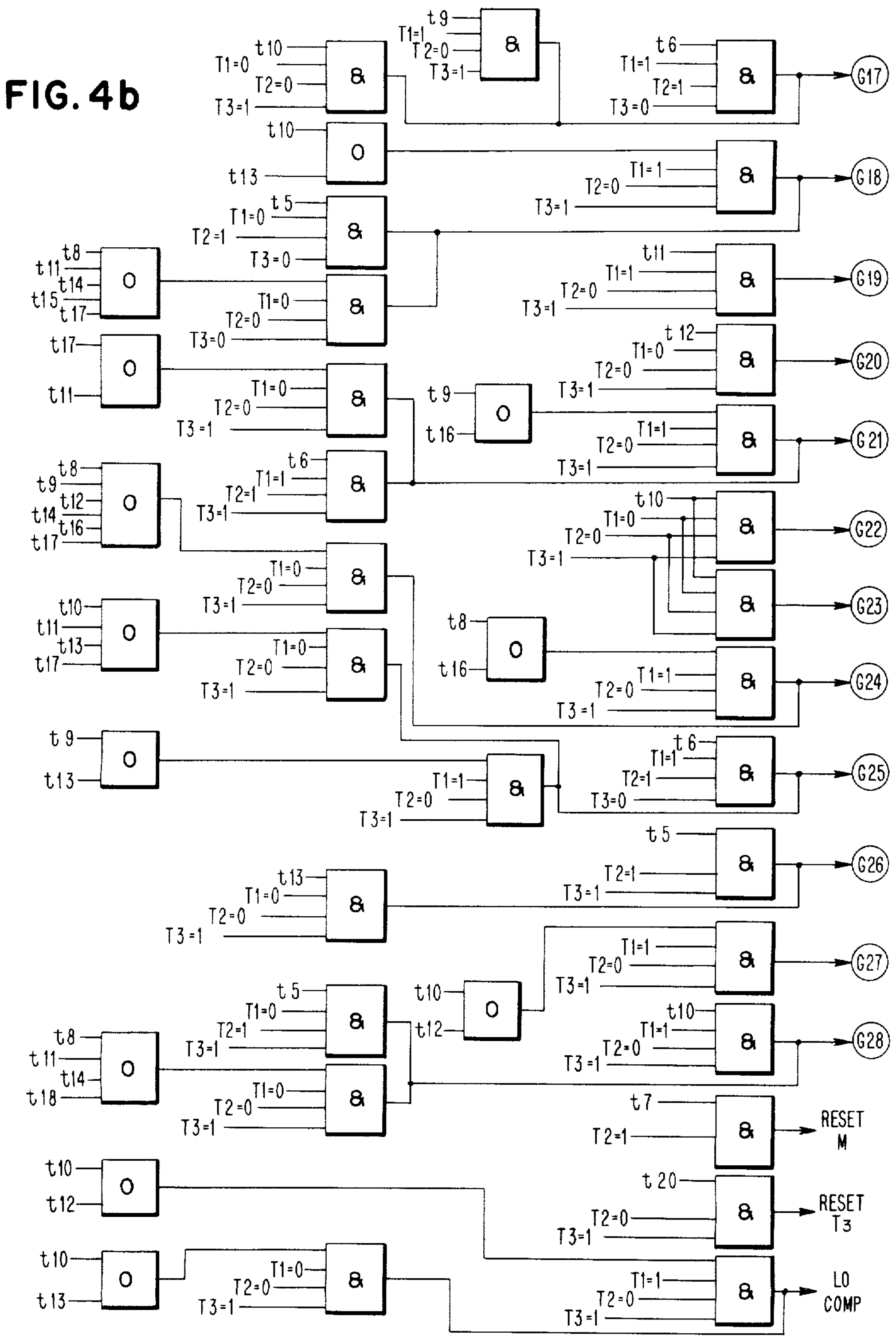

*Introduction.*—FIGS. 3*a* through 3*e* when arranged as shown in FIG. 3*f* form a logic diagram illustrative of apparatus embodying the invention. This diagram will hereafter be referred to as FIG. 3. The apparatus shown in FIGS. 4*a* and 4*b* is necessary for the operation of the invention. Gates are shown in FIG. 3 by means of a circle enclosing the letter G and a number, for example: "G16." A signal applied to the vertical line entering the gate will cause a transfer of information through the gate along the horizontal lines passing through the gate. The signal necessary to operate each gate is generated by circuitry shown in FIGS. 4*a* and 4*b*, in accordance with timing signals from the clock 401 and control signals from the triggers T1, T2, T3 and T4, shown in FIG. 3. Well known logic circuits indicated by standard symbols, such as "&" (AND), "O" (OR) and "$\forall$" (Exclusive OR) are used throughout FIGS. 3, 4*a* and 4*b*.

Referring first to FIG. 3, data enters and leaves the apparatus on lines 01 through 100. The lines are selected for sending or receiving information one at a time by the scanner 4. The particular line selected by the scanner 4 is designated by a line address register (LAR) 402. The line selected by the line address register 402 is determined by the number of times that a clock 401 has cycled through its 25 steps. The number of cycles of the clock 401 is recorded by a clock cycle counter (CCC) 403 which is stepped by a signal on line 404 once for each 25 cycles of the clock 401. The clock cycle counter 403 is capable of counting as many cycles of the clock 401 as there are lines, the line address register 402 being set to designate the line corresponding to the last clock cycle counted by the clock cycle counter 403. The clock cycle counter 403 also specifies a number of locations in the storage 3 corresponding to the number of lines. The setting of the clock cycle counter 403 is stored in a storage address register (SAR) 405 which causes a storage address selector (SAS) 406 to select a location (holding a "line control word") in storage 3 corresponding to the line scanned by the scanner 4.

Since the storage 3 is operated in synchronism with the scanner 4, the line control word corresponding to the line scanned by the scanner 4 will be addressed during the clock cycle during which that line is scanned. The selected line control word removed from storage 3 is entered into a storage data register (SDR) 407. It remains in the storage data register 407 for substantially an entire clock cycle following its selection. The line control word comprises a number of fields for which space is provided in the storage data register 407. The storage data register 407 may also be used for other purposes, the format of this alternate use being also shown in FIG. 3. Bits received from the line are assembled into characters in the corresponding line control word in the storage data register 407 by entering the bits into the character assembly field at a bit position determined by the receive gates 408. Every time a bit has been entered the bits so far entered into the character assembly field are shifted one position to the right by means of the shift block 409. The position into which the receive gates 408 enter received bits is always the same for any particular character length, but differs for different character lengths. The *n* bit mark field specifies the number of bits in the character being received and by means of the line 410 controls the receive gates 408 to specify the point of entry into the character assembly field. The *m* bit count field, which is initially set to one, is incremented every time a bit is received by the add plus one circuit 411. When the *n* bit mark field contents equals the *m* bit field contests, there will be an indication from the compare circuit 412 that a full character has been received. The full character will then be sent to the memory 2, at an address indicated in the address field of the data register 407, for message assembly. In sending, a full character received from a memory 2 address indicated by the address field in the line control word stored in the storage data register 407 is placed into the character assembly field. The number of bits in the character is indicated in the *n* bit mark field and the number of bits actually sent out on the line is kept track of in the *m* bit count field. Bits are removed from the character assembly field one at a time via the line 413 and the remaining bits are shifted one position to the right as previously described. The compare circuitry 412 will generate a signal indicating that a full character has been transmitted when the number of bits sent equals the number of bits indicated by the *n* bit mark field. Another character will then be called for from the memory 2 at an address specified by the address field of the storage data register 407. Every time that an address from the storage data register 407 is used, that address is incremented by one by the add plus one circuitry 414.

Addresses specified by the address field of a line control word placed in the storage data register 407 give access to a character stored in the memory 2. The particular character chosen is determined by a memory address selector (MAS) 415 which is operated in accordance with the specified address placed into the memory address register I (MAR I) 416. Selected characters are entered by the memory 2 into the character field of a memory data register (MDR) 417. The memory 2 also holds an inventory word which is placed into the memory data register 417 at times that the memory data register is not used for receiving characters.

Figure 5A:
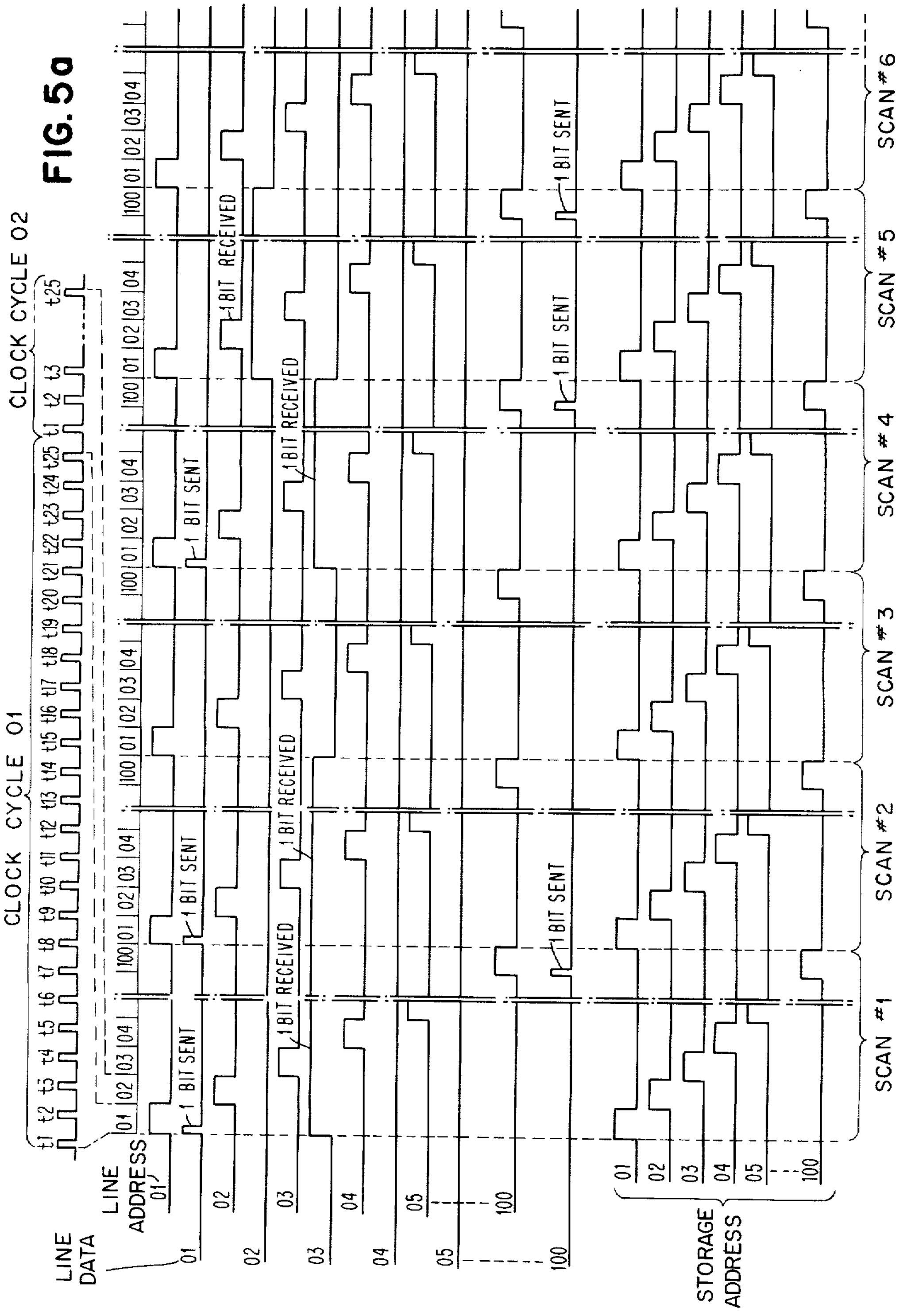

*Timing.*—Referring now to FIG. 5*a* the timing of the apparatus shown in FIG. 3 will be described. The clock 401 continuously steps through 25 cycles *t*1, *t*2, etc., through *t*25. This is shown in FIG. 5*a* by the 25 pulses labeled *t*1 through *t*25 under clock cycle 01. At the end of each 25 clock pulses another clock cycle will begin, the 25th clock pulse stepping the clock cycle counter 403 so that it will indicate a new clock cycle. The clock cycle counter 403 indicates how many times the clock 401 has completely cycled through its 25 pulse steps up, to a maximum of 100 cycles. In FIG. 5*a*, the clock cycle indicated by the clock cycle counter is shown to be 01, 02, etc., through 100. Since each clock cycle is used by the scanner 4 to select a corresponding line, and there are 100 lines, a complete stepping of the clock clock counter 403 from 01 to 100 is called a scan. Each time that the clock cycle counter 403 reaches 100, the next clock cycle will be 01, and also new scan will begin. No circuitry is provided for keeping track of the number of scans, the scan number being indicated in FIG. 5*a* as scan #1, scan #2, etc., for convenience only.

Still referring to FIG. 5*a*, the use of the clock cycle counter 403 to control the scan of 4 is illustrated by the signals labeled line address, of which 100 possible line addresses are shown. For example, a signal on line address 01 indicates that the clock cycle counter 403 has caused the line address register 402 to indicate the address 01, to which the scanner 4 is set. In FIG. 5*a* it can be seen that every time the clock cycle counter 403 indicates a cycle number, of the clock 401, between 01 and 100, the line address register 402 will be set to a corresponding address between 01 and 100. The line address register 402 remains set to the address for an entire clock cycle, during which cycle the clock 401 supplies 25 pulses *t*1 through *t*25. Since, as has been previously explained, the clock cycle counter 403 also specifies to the storage address register 405 a location in the storage 3, a storage 3 location between 01 and 100 will be selected during each clock cycle, the storage 3 location selected corresponding to the clock cycle number. The storage address specified by the clock cycle counter 403 remains in the storage address register 405 during the entire clock cycle. In summary, it can be seen from FIG. 5*a* that during each clock cycle a corresponding one of both the lines and the storage 3 locations are selected. For example, during clock cycle 04 the address of line 04 is placed in the line address register 402 and the address of the line 04 control word is placed in the storage address register 405.

Still referring to FIG. 5*a* the signals labeled line data indicate signals present on the lines as a result of messages received or sent. For purposes of explanation it is assumed that received bits are synchronized with the apparatus of FIG. 3*a*, that is, each bit begins at the beginning of a scan (at the beginning of a clock cycle 01) and lasts for an entire scan (ending at the end of a clock cycle 100). This is a simplification, since the synchronizing apparatus is not essential to the practice of the invention. A practical synchronizer intended for use with this apparatus is described in copending application Serial No. 198,841, filed May 31, 1962, J. R. Kersey et al., "Synchronizing Apparatus." Some of the circuits necessary to implement the structure of this copending application are shown in FIG. 3 and will be described below. In FIG. 5*a*, if a 1-bit is to be sent on a particular line it will be sent during the clock cycle corresponding to that line at time pulse *t*3. For example, a series of bits 110100 is shown being sent on line 01. It is common practice in telegraphy to have adjacent bits abut, the circuitry for accomplishing this not being shown since it is not essential to the practice of the invention. Bits received on the lines may, however, be received in standard telegraphic fashion with adjacent bits abutting. For example, in FIG. 5*a* line 03 has present on it during scan #1 and scan #2 two abutting 1-bits. A 1-bit will be recognized at some time during clock cycle 03 of scan #1 and another 1-bit will be recognized during clock cycle 03 of scan #2. During clock cycle 03 of scan #3 a 0-bit will be recognized. During scan #4 at clock cycle 03 another 1-bit will be recognized.

The elements of the apparatus will now be described in detail.

*The clock and clock cycle counter.*—The clock 401, capable of generating signals on one of 25 output lines labeled *t*1 through *t*25 at a time, is of standard construction well known in the art. The exact frequency of generation of clock pulses is not important to the practice of this invention except insofar as it must be faster than the duration of a single received bit, since 25 clock pulses are required during each one of 100 complete clock cycles (2500 clock pulses) which, in this simplified example, are required during one bit time. The outputs of the clock 401 are supplied to the control circuitry of FIGS. 4*a* and 4*b*, output *t*25 also being supplied to the input 404 of the clock cycle counter 403.

The clock cycle counter 403 may be any counter known in the prior art capable of counting at a rate which is greater than the bit rate of information on the lines in this simplified example, each of the 100 lines being scanned at least once during the duration of a bit. The counter must indicate its contents at a number of outputs in order to operate the scanner 4 and to select locations in the storage 3. It is obvious that with suitable decoders a binary counter may be used. The counter 403 is incremented by one every time that a signal is applied at the input 404. When the contents of the counter are equivalent to the decimal value 100, the counter begins counting from the decimal value one again.

*The scanner and line address register.*—The line address register 402 receives the current clock cycle count indicated by the counter 403 and stores it for one clock cycle. The contents of the line address register 402 are changed when a new clock cycle count is entered by the clock cycle counter 403. Due to the particular scanner 4 used in this example, it is necessary that the line address register 402 have 100 output lines, one of which has a signal applied to it at any one time. It is obvious therefore that the line address register 402 construction is a function of the type of scanner 4 used, it being possible that another type of scanner will require, for example, binary control signals. The line address register 402 may be constructed of standard flip flops, delay lines, logic-block latches, etc.

The scanner 4 functions to connect one of the lines 01 through 100 to a common send and to a common receive line connecting to the balance of the apparatus. This method of operation is known as time division multiplex, any of the many well known types of multiplexing apparatus being available for use in place of the scanner 4. Two AND blocks, of which 418, 419 associated with line 01 are typical, are connected to each one of the lines 01 through 100. When the line address register 402 output (for example 01) corresponding to one of the lines has a signal applied to it, both AND blocks, for example 418 and 419, will be selected. If at this time the line (in this example 01) has a 1-bit on it, the output of one of the AND circuits, for example 419, will pass the 1-bit to the common receive line. If there is a 1-bit on the common send line, the other one of the AND circuits, for example 418, will pass the 1-bit to the line (in this case line 01) selected at that time. As the clock cycle counter 403 causes the line address register 402 to place a signal on line address register 402 outputs 01 through 100 in turn, the AND circuits associated with lines 01 through 100 will be selected in turn also.

Any one line may be either sending or receiving information, but may not be doing both. The status of a line is determined by a field called the *S/R* field of the associated line control word in the storage 3. This field is examined at the same time that the line is scanned, the contents of this field causing the trigger T1 to be set to a state which will operate a proper one of the two gates G1 or G2. For example, if the line 01 control word is set to the one state, there will be an output *S/R*=1 from a convert block 420 causing the trigger T1 to be set to the one state operating the gate G2 and disabling the gate G1. Then if a 1-bit is sent on the common send line, it will be passed by a gate G2 to the line 01 at clock cycle 01. Even if information is due to some error received on line 01, it will be ignored since gate G1 is disabled. The trigger T4 is shown in order to indicate how the invention of the referenced Kersey et al copending application "Synchronizing Apparatus" may be incorporated into this apparatus, though any other scheme could be used. If it is assumed that timing information (last timing bit LTB) is received with the data on each line, then it is possible to distinguish unique bits from a group of abutting bits. A last timing bit field (LTB) may be associated with each line control word in the storage 3. This LTB field is interrogated at the same time that the corresponding line is scanned. The LTB field is set to the condition of the timing information derived from the associated line. Each time that the field is interrogated the trigger T4 is set to the field contents via the convert block 421 and the currently derived timing information on the scanned line is applied to the two inputs of the AND blocks 422 and 423. As a result the state of the timing information during the previous scan (stored in the LTB field) is compared with the state of the timing information during the current scan. If there has been a change, then a bit should be received. There will be an output from one of the AND circuits 422 or 423 when there is a change between two successive scans of the same line causing the AND circuit 424 to be enabled, and in accordance with the control circuitry of FIG. 4*a*, gate G8R will be operated. Gate G8R will not be operated, however, if there has not been a change in the LDS field between two successive scans on the same line. This prevents a single bit from being counted as more than one bit, due to its presence for more than one scan of the same line. Gate G8S is operated regularly without regard to the LDS field.

*The storage and associated registers.*—The storage 3 may be any well-known type of storage device such as a magnetic drum, flip flops, cryogenic device, etc. For purposes of illustration it is assumed that the storage 3 is a magnetic core random-access storage area having 100 addressable locations each of which stores a 48-bit word called a line control word. It is obvious that this size has been chosen to simplify the explanation of a device having 100 lines so that the control word corresponding to each line may be assigned an address which is the same as the line number. For example, the line 03 control word is found at address 03 of the storage 3. Addresses in the storage 3 are selected by the storage address selector 406 in accordance with addresses stored in the storage address register 405.

The storage address register 405 comprises a plurality of storage devices capable of receiving and holding the clock cycle number, indicated by clock cycle counter 403, for one clock cycle. The storage address selector 406 is a decoder which utilizes the information stored in the storage address register 405 to select one out of 100 storage 3 locations. Since a magnetic core storage of the type which storage 3 is assumed to be is not usually addressed by decimal numbers, the storage address selector 406 must be capable of translating the information in the storage address register 405 to whatever code is required to remove the desired information from the storage 3. The address lines connecting the storage address selector 406 to the storage 3, which are numbered 01 to 100, are only representative of the function performed and do not necessarily indicate the actual connecting lines. When an address in the storage 3 is selected by placing an address in the storage address register 405, the contents of the location addressed will emerge from the storage 3 during the next clock pulse via the readout line through gate G16 and will be entered into the storage data register 407.

The storage data register 407 is a buffer which receives all information read from the storage 3. Further, all information entered into the storage 3 must pass through the storage data register. Since it has been assumed that the storage 3 is a magnetic core device, such storage devices normally being "destructive" during readout, it is necessary to immediately rewrite into storage 3 whatever was removed during readout. This is accomplished by operating gate G15 which connects the storage data register 407 to the storage 3 to rewrite information read into the location from which it was read. The storage data register 407 is constructed of a plurality of storage devices (delay lines, logic-blocks, transistor flip flops, etc., may be used) of which 48 would be required if 48 bits of the word read from the storage 3 are used. The storage data register 407 is used to receive control words from the storage 3 and is also used as a buffer for other purposes to be described. In FIG. 3, the two uses of the storage data register 407 are symbolically shown by indicating on two levels the two word formats which it may contain. Since the storage data register 407 contains only one of these word formats at any one time, the symbolic representation is not intended to imply that the storage data register 407 is constructed in any special way to accommodate these two word formats (though it may be if so desired).

The control word for whatever line has been addressed, placed in the storage data register 407, comprises a 16-bit address field, a 1-bit last timing bit (LTB) field, a 4-bit *n* bit mark field, a 4-bit *m* bit count field, a send receive (*S/R*) field and an 11-bit character assembly field. The 16-bit address field of each control word is divided into a high order (HO) field comprising 11 bits and a low order (LO) field having 5 bits. The high order portion of the address is used to indicate one of 2048 blocks in the memory 2 to be described below. The low order portion of the address field is used to specify one of the 32 character locations (0 through 31) within the block specified by the high order portion. When the low order portion comprises five zeros (decimal 0) the first character location in the specified block is being addressed. When the low order portion of the address field contains 5 ones (decimal 31) the last character location (the block control character) of the specified block is being addressed. A new block must be assigned or an empty block may be allocated to an empty chain, when the last location in a block is reached. The decoder 425 recognizes the occurrence of 5 ones in the low order portion of the address field causing the trigger T3 to be set to the one state. Each time that an address is removed via the gate G14 to call for a new character or to store a character in the memory 2, the address is incremented by one in the add circuitry 414. Thus characters are obtained from, or sent to, successive locations in the memory 2. However, when the low order portion of the address field becomes all ones (which occurs before an incrementation can affect the high order portion) another block will be assigned as will be described.

The LTB field is used in synchronizing the operation of the apparatus with the received signals, the LTB field of each control word being set to the signal condition indicated by the associated line. Whenever the condition on the associated line changes, the associated LTB field changes also. The use of this field to provide means for recognizing a number of abutting bits was briefly explained with reference to the scanner 4 and is the subject of the previously mentioned copending Kersey et al. application.

The 4-bit *n* bit mark field is set to a value equal to the number of bits in the characters being sent or received on the line associated with the control word in which the field occurs. It may be different in each line control word. During receive the value of the *n* bit mark field is sent to the receive gate 408 via the line 410 to cause each receive bit to be entered into the same position of the character assembly field of the control word. This position is changed as a function of the number of bits in the character, for example, if a character has 5 bits then the bits will be entered into position 44 of the character assembly field. If the *n* bit mark field indicates that a character has 6 bits the bits will be entered into the bit 43 position of the character assembly field. The 4-bit *m* bit count field is initially set to one in each control word by a signal reset *m* on line 427. Thereafter each time that a bit is received, or sent, the *m* bit count field contents are routed through the add plus one circuitry 411, to increment the *m* bit count field by one so that it will at all times be equal to the number of bits, sent or received, plus one. The *n* bit mark field and the *m* bit count field are compared (before incrementing of the *m* bit count field), each time that a bit is received or sent, in the compare circuit 412. When the two fields contain numbers that are equal ($n=m$) the complete receipt or transmission of a character will be indicated by an output from the compare circuit 412 which sets the trigger T2 to the one state.

The 1-bit send receive field (*S/R*) is set in each line control word to indicate whether the associated line is being used to send or to receive signals. Contents of this field are sensed by operation of the gate G9 which sends a signal to the trigger T1, previously explained with reference to the scanner 4.

The 11-bit character assembly field of the storage data register 407 is used to assemble receive bits into characters, and to hold characters while they are sent bit by bit onto a line. The maximum capacity of the character assembly field provides for an 11-bit character, though it is common to use shorter characters. During the receiving of bits each receive bit is entered into the character assembly field via the receive gates 408 and the gate G4 in a first position determined by the *n* bit mark field. After each bit is received all of the bits in the character assembly area are shifted one position to the right by the shift circuit 409. The fully assembled character will extend from the bit position, into which bits are entered, to the right into bit position 48. Entry of bits and shifting of entered bits is terminated when the compare circuit 412 indicates that the *n* bit mark field and the *m* bit count field are equal. At this time the character in the character assembly field is emptied into the memory 2 at a location indicated by the address field of the control word. The next bit received in the character assembly area will therefore be the first bit of a new character. During sending of information a full character is initially entered into the character assembly area with the lowest order (right hand bit) being placed in the bit 48 position of the field. The lowest order bit is removed via gate G6 and is sent to the scanner for transmission to the associated line. The entire contents of the character assembly field are then shifted one position to the right by the shift circuitry 409 so as to bring the next bit into the bit position 48 for removal during the next clock cycle. In this way, during successive shifts, all bits of a character are made available for serial transmission. Transmission and shifting are terminated when the *n* bit mark field and the *m* bit count field are equal indicating that a full character has been transmitted, another character being obtained from the memory 2 at an address indicated by the address field of the control word. The next bit to be sent through the gate G6 is the first bit of this new character.

The storage data register 407 is also used as a buffer as indicated by the two buffer fields buffer A and buffer B, each having 11 bit positions. Information is entered into buffer A via gate G4 and into buffer B via gate G5. Information is removed from buffer A via gate G7 and from buffer B via gate G11.

*The memory and associated registers.*—The memory 2 is constructed in a fashion similar to the storage 3 although this is not a requirement. Locations in the memory 2 are selected by the memory address selector 415 in accordance with addresses supplied from the memory address register I (MAR I) 416 or the memory address register II (MAR II) 427. The memory 2 is, for the purposes of illustration, divided into a number of sections each comprising a number of locations wherein is stored a 48-bit word or a fraction of a word. At location $Y+1$ in the memory 2 may be stored an inventory word the fields of which will be explained with reference to the memory data register 417 below. At location Y of the memory 2 may be stored a control word address which is the 16-bit address field of a line control word from the storage 3. Three control word address sections are shown since a 48-bit word will hold three 16-bit fields, the address Y however referring to only one of these address fields. A section of the memory 2 is allotted for the use of additional inventory words, line control words, line control word address fields, programs of instructions and other miscellaneous requirements. The balance of the memory 2 is used for message assembly during receiving operations and as a source of messages during sending operations. A section, having 2048 data blocks, is provided for assembly and as a source. One of these data blocks, data block 4, is shown in detail.

Data block 4, which is intended to be a typical data block, comprises 32 addressable character locations (numbered 0 through 31) of 12 bits each. A number representing the address of each location is shown in FIG. 3 in its location in the block. The high order 11 bits of the address indicate, in binary code, the number of the block (0 through 2047); and, the low order 5 bits of the address indicate, in binary code, the character location (0 through 31) in the block. Therefore the first character location in block 4 is designated by the binary address: 0 . . . 100/00000. The 32nd character location (that is, location number 31 since the first location is numbered zero) in block 4 is designated by the binary address: 0 . . . 100/11111. The low order 5 digits of the binary address represent the character location and the high order 11 bits represent the block number only if each of these sections is treated as a separate binary word. Otherwise, if the high order and low order portions of the address are treated as one binary word there will not be a direct equivalence between the data block number shown and the binary number. For example, data block 4 would be identified as data block 128 and data block 5 would be represented as data block number 160. It does not matter which of these schemes is adopted in the practice of this invention. In either scheme, the first character location of every block has five low order zeros and the last character location of each block will be designated by an address of five low order ones.

Figures 1A, 1B:
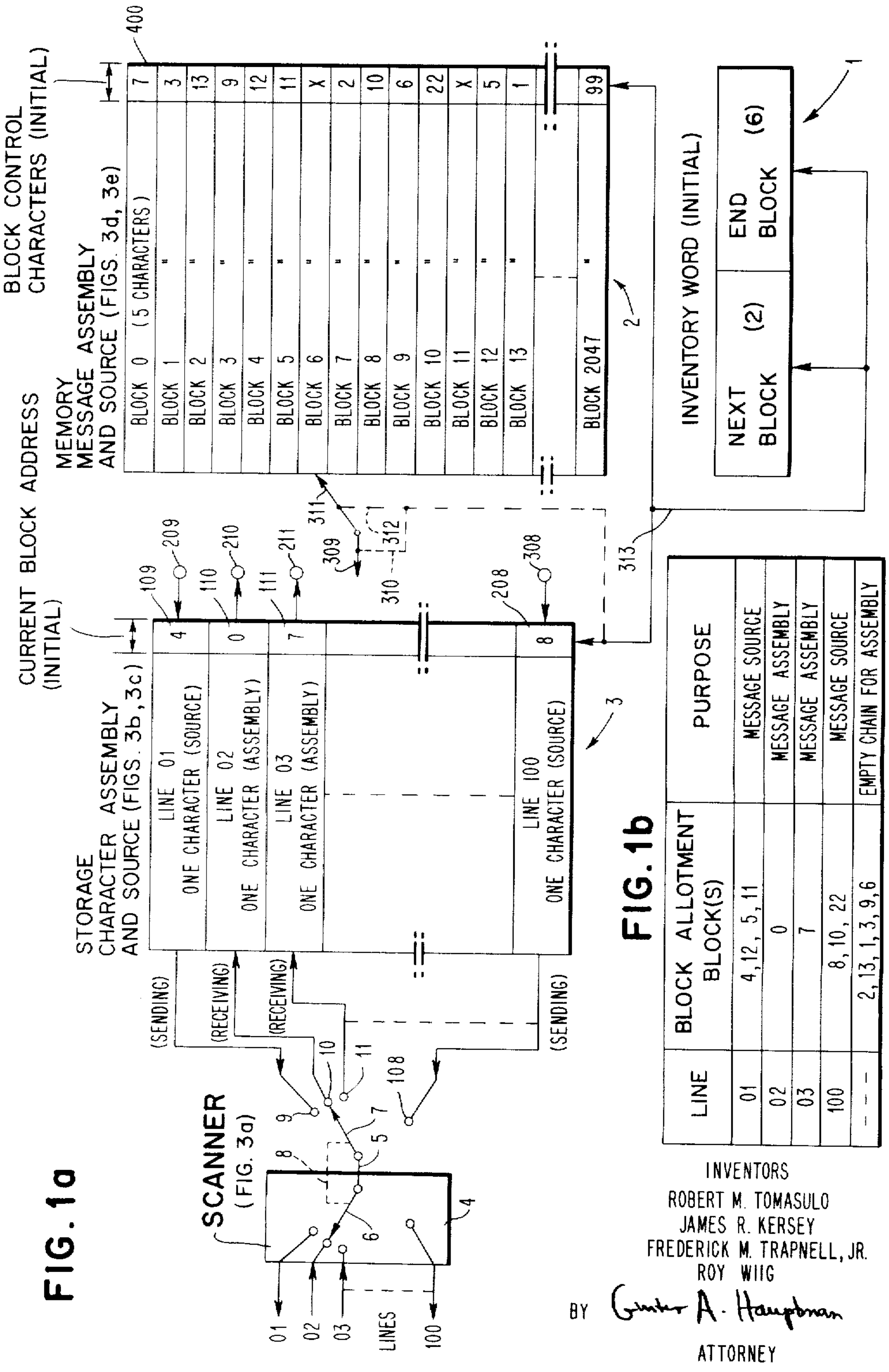
Figure 2A:
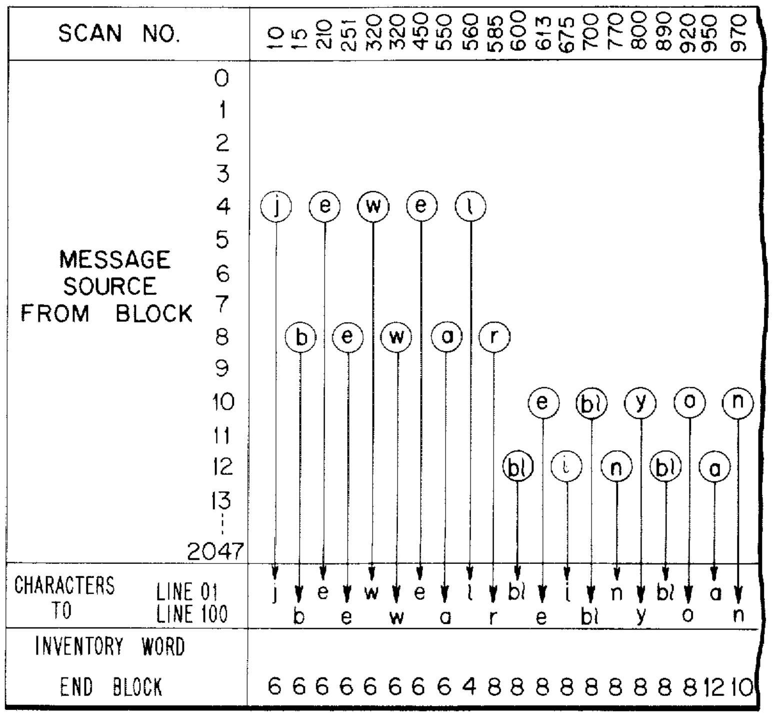
Figure 2B:
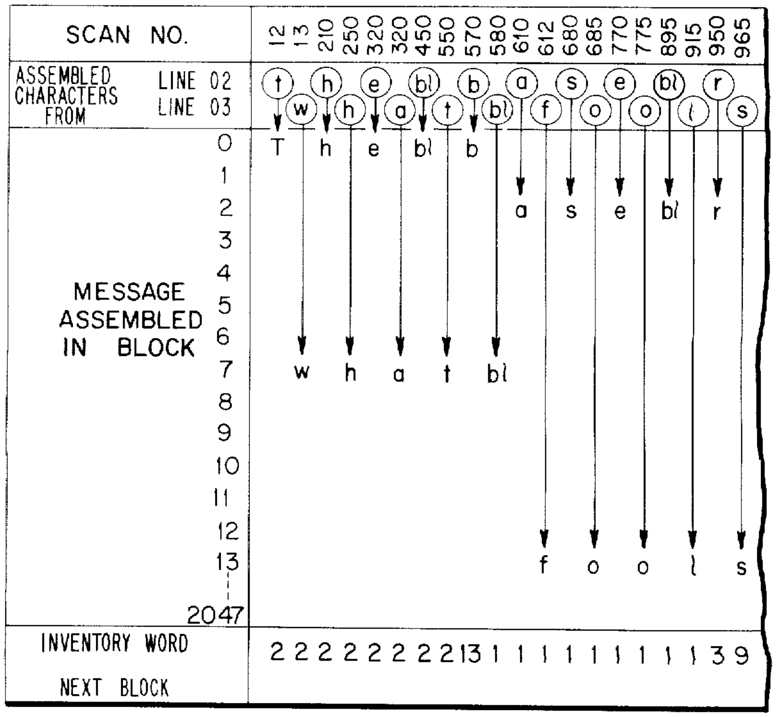
Figure 2C:
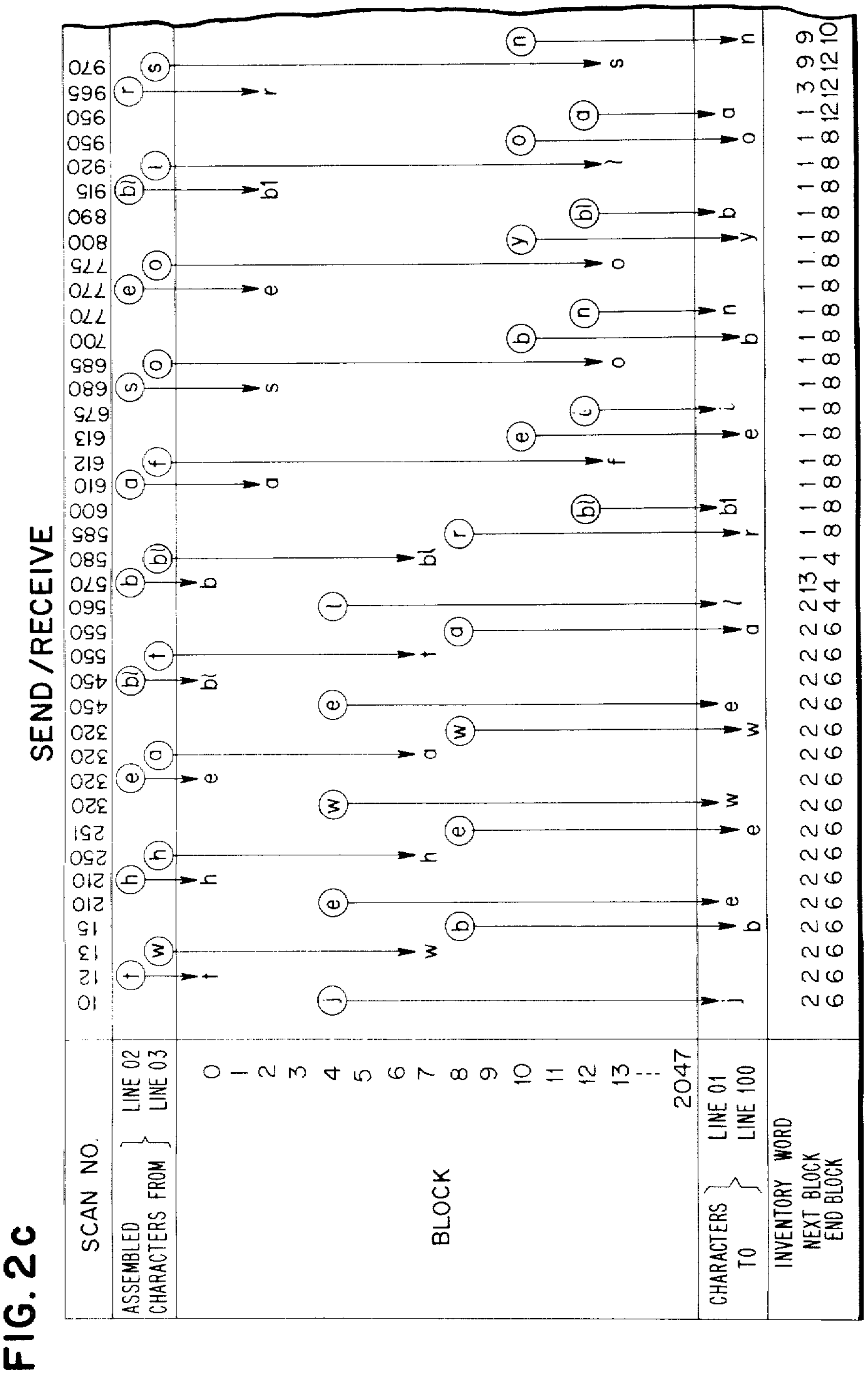

The last character location in each block is not used to store an information character but rather stores a block character control character which indicates the location of the first character in another block. This block control character location is recognized by the presence of five low order ones in the address identifying the location. Therefore the use of 32 characters per block is a convenient scheme though it is not essential to the practice of the invention (only five characters being shown in each of the blocks in the apparatus as described with reference to FIG. 1*a*), since the last address in any block can be recognized in other ways.

The memory address selector (MAS) 415 selects any character location designated by the memory address register I 416 or memory address register II 427. For example, the line labeled 2047–31 selects the last block control character of block 2047. When a location in the memory 2 is selected it is either read via gate G25 or written via gate G21. Since the memory 2 is assumed to be of a core storage type, access to a location for reading normally results in the destruction of the contents of the location. Therefore the same information is normally re-entered into the location from which it was read, which may be accomplished in the memory 2 via the gate G25, the gate G17, the memory data register 417 and the gate G21.

The memory address register I (MAR I) 416 receives addresses from various sources via the gates G26, G22 and G24. In construction it is similar to the storage address register 405 with the exception that it contains circuitry for setting the low order portion of any address placed in it to all ones. This is accomplished via the line labeled LO complement 429. The low order portion of the address is set to all ones regardless of its prior condition if a signal is applied on this line. In this way the block control character of the address block is accessed. The memory address register II (MAR II) 427 is identical to the storage address register 405. It may be set to any address applied via line 430, for example, address Y (where a line control word address field is placed) or address $Y+1$ (where the inventory word is stored).

The memory data register (MDR) 417 serves as a buffer register for the memory 2. In construction it is similar to the storage data register 407 though it may be of any convenient construction. The memory data register 417 is used for several purposes, the formats of two of which are shown in FIG. 3. For example, the memory data register 417 may store, in an 11-bit character field, a character received via gate G18 and removed via the cable 431. The memory data register 417 also serves to hold the inventory word found at location $Y+1$ in the memory 2. This is accessed by placing the address $Y+1$ into the memory address register II 427 via the cable 430, and operating the gate 24 which enters the address $Y+1$ into the memory address register I 416. The inventory word comprises a 16-bit next block address field and a 16-bit end block address field. An 11-bit address field is shown in association with the inventory word format (though not stored in the memory 2 as part of the inventory word) to indicate that these positions may be used to store the high order bits of an address. Use of this field causes the low order five bits of the address to become all zeros. The next block address field of the inventory word indicates the beginning of the chain of empty blocks in memory 2 which constitute a pool available for use during receive and send operations and the end block address field indicates the end of the chain (i.e., the beginning of the last block in the chain). The next block address is used to supply blocks from the pool during receiving operations and the end block address being used when additional blocks become empty during sending operations. In each case, as will be described, the low order 5 bits are all zeros so that the first location of each block is identified. In the event that the next block address and the end block address are equal, the compare circuit 428 will indicate that the end block in the empty chain has been reached. FIGS 4*a* and 4*b* will now be discussed.

*The Controls.*—FIGS. 4*a* and 4*b* illustrate a number of logic blocks which receive input signals from the triggers T1, T2 and T3 and from the clock 401. The outputs of the logic circuits are applied to the gates shown in FIG. 3 and also supply signals which reset the *m* bit count field in the storage data register 407, reset the trigger T3, set the low order bits of the memory address register I 416 to all ones and enable the AND circuit 424. The generation of addresses Y and $Y+1$, which are applied to the memory address register II 427 on line 430 is also determined in accordance with the inputs to FIGS. 4*a* and 4*b*. The operation of the apparatus of FIGS. 4*a* and 4*b* and the line 430 in FIG. 3 is believed to be obvious from the illustrations to follow, with reference to FIGS. 5*a*–5*d*. For example, gate G3 is operated whenever there is an output from either AND circuit 423 or AND circuit 424. Gate G3 is operated by AND circuit 424 when the clock 401 is at pulse *t*13 if trigger T1 is set to the one state, trigger T2 is set to the zero state and trigger T3 is set to the one sate. This occurs during the send operation when the end of a block has been reached. Gate G3 is operated by the output of AND circuit 423 during pulse time *t*17 of the clock 401 under the same conditions with the exception that the line being scanned is in receive status as indicated by the trigger T1 being set at zero. Thus if the end of a block has been reached gate G3 will be operated at clock pulse *t*13 if the particular line in question is in send status and at clock pulse *t*17 if that line is in receive status..

*Operation: In General.*—The operation of the apparatus of FIG. 3 will now be explained with reference to the pulse diagrams of FIGS. *5b*, *5c* and *5d*. The pulse diagrams show the operation of the gates and the conditions of the triggers, reset, and complement signals during the receipt and transmission of messages substantially as shown in FIG. *2c*. FIG. *5b* shows the operation of the apparatus during scan #1 for the scanning of lines 01 and 02 during clock cycle #1 and clock cycle #2. During scan #1, line 01 sends a bit of a character preceding the character (j) shown in FIG. *2c* (which character is not sent until after scan #10). Also, during scan #1, line 02 receives a bit which is used to assemble a character (t). FIG. *5c* shows the operation of the apparatus during scans #10 and #12 during which time line 01 is supplied with a character (j) to be sent on line 01 and line 02 has received a full character (t) which must be assembled into a message when subsequent characters are received. FIG. *5d* shows the operation of the apparatus during scans #560 and #570 when line 01 has completely sent the characters (only the five letters "jewel" are shown in FIG. *2c*, whereas it is assumed here that the full 31 character capacity of the block has been used) found in one block (4) emptying that block, and line 02 has completely filled a block (0) with received characters (only the five characters "the *b*1*b*" are shown in FIG. *2c*, whereas it is asumed here that the full 31 character capacity of the block has been filled) so that another block (2) must be assigned. The operation of gates G8R and G8S though shown in FIGS. *5b*, *5c* and *5d* will not be explained since they are not essential to the practice of this invention and form the subject of the referenced copending patent application of Kersey et al. Synchronization may be assumed here for purposes of simplicity.

*Operation: Character Handling (FIG. 5b)*

*Scan #1, Clock Cycle #1, Clock Pulse 1.*—Gates G15 and G16 are operated. The line address register 402 has a signal at its output line 01 enabling AND circuits 418 and 419. The storage address register 405 sets the storage address selector 406 to activate its output 01. As a result the line 01 control word is read out of the storage 3 via the gate G16 and is entered into the storage data register 407 as shown by the upper format of FIG. 3. The contents of storage 3 location 01 are immediately regenerated via gate G15. The address field of this control word contains the number 4–0 indicating that the next character is to be removed from the first location in data block 4. The *n* bit mark field contains the number 6 indicating that the character being transmitted on line 01 contains 6 bits, the *m* bit count field contains the number 1 indicating that no bits have been transmitted on the line 01 for this character, the *S/R* bit is set to the one state indicating that the line 01 is being used for transmission and the character assembly field contains the binary equivalent of a character (not specified) to be transmitted.

*Scan #1, Clock Cycle #1, Clock Pulse 2.*—Gates G2 G9 and trigger T1 are operated. Gate G2 and trigger T1 remain in the operated condition for the balance of the clock cycle #1. The operation of gate G9 causes the contents of the *S/R* field to be applied to the convert block 420 which sets the trigger T1 to the one state operating the gate G2. This places line 01 in the send status.

*Scan #1, Clock Cycle #1, Clock Pulse 3.*—Gate G6 is operated. The operation of gate G6 causes the bit in the low order position of the character in the character assembly field of control word line 01 to be sent via cable 413 through gate G2 and AND circuit 418 outward on line 01.

*Scan#1, Clock Cycle #1, Clock Pulse 4.*—Gates G4, G7, G10 and G12 are operated. The operation of gates G7 and G4 causes the removal of the entire character in the character assembly field to the shift circuitry 409, where it is shifted one position to the right, and the reentering of the shifted information via gate G4 into the character assembly field. The operation of gate G10 and gate G12 causes the *m* bit count field (1) and the *n* bit mark field (6) respectively to be sent to the compare circuit 412. The compare circuit 412 indicates that the two fields are not equal ($m \neq n$), trigger T2 remaining set to the zero state. The *m* bit count field, being passed through the add circuit 411, is incremented ($m=z$).

*Scan #1, Clock Cycle #1, Clock Pulse 7.*—Gate G13 is operated. The low order 5 bits of the address field in the storage data register 407 are sent to the decoder 425. Since the low order 5 bits are not all ones ($LO \neq 1$'s), the trigger T3 remains set to the zero state.

*Scan #1, Clock Cycle #1, Clock Pulse 8.*—The gate G15 is operated. The contents of the storage data register 407 are re-entered into the location of control word line 01 in the storage 3, as changed during the clock cycle.

*Scan #1, Clock Cycle #2, Clock Pulse 1.*—Gates G2, G15 and G16 are operated. The trigger T1 remains set to the one state because there were no signals to reset it after the end of clock cycle #1, gate G2 remaining activated as a result. The clock cycle counter 403 having recorded the second cycle of the clock 402 sets the line address register 402 and the storage address register 405 to addresses which causes the scanner 4 to select line 02 and the storage 3 to select the line 02 control word. The operation of gate G16 causes the line 02 control word to be read into the storage data register 407 and the operation of gate G15 causes it to be returned to the storage 3 to replace the information destroyed during readout. The address field of the line 02 control word contains a designation (0–0) of data block zero character location zero. The *n* bit mark field is set to the number 6 indicating that the characters being received on line 02 contain 6 bits. The *m* bit count field is set to the number one indicating that no bits have been received from line 02. The *S/R* field is set to zero indicating that line 02 is in receive status. The character assembly field is empty since no bits have been received.

*Scan #1, Clock Cycle #2, Clock Pulse 2.*—Gate G9 is operated. Operation of gate G9 causes the *S/R* field to be sensed. Since this field is zero for the line 02 control word, the convert block 420 will set the trigger T1 to the zero state causing gate G1 to be operated and gate G2 to be disabled, placing the presently scanned line 02 in the receive mode. These conditions continue for the balance of clock cycle #2.

*Scan #1, Clock Cycle #2, Clock Pulse 4.*—Gates G4, G10 and G12 are operated. The operation of gate G4 causes the entry of a bit from the line 02 through the gate G1 and the receive gates 408 into bit position 43 of the line 02 character assembly field. Operation of the gate G12 causes the selection of the bit position 43 by the receive gates due to the action of the contents of the *n* bit mark field via the line 410. Operation of the gates G10 and G12 together cause the *n* bit mark field (6) and *m* bit mark field (1) to be compared ($m \neq n$) and the *m* bit field to be incremented by one ($m=2$).

*Scan #1, Clock Cycle #2, Clock Pulse 5.*—Gates G4 and G7 are operated. The operation of gates G7 and G4 cause the contents of the character assembly field to be passed through the shift circuit 409 causing the contents to be shifted one position to the right.

*Scan #1, Clock Cycle #2, Clock Pulse 7.*—Gate G13 is operated. The operation of gate G13 causes the decoder 425 to examine the low order bits of the address field of line 02 control word ($LO \neq 1$'s). The trigger T3 as a result remains set to the zero state.

*Scan #1, Clock Cycle #2, Clock Pulse 8.*—Gate G15 is operated. The operation of gate G15 causes the contents of the storage data register 407, as changed, to be entered into the control word line 02 location of storage 3.

*Operation: Message Handling (FIG. 5c)*

*Scan #10, Clock Cycle #1, Clock Pulse 1.*—Gates G2, G15 and G16 are operated. Trigger T1 is assumed set to the one state during the scan of the previous line (100) which has a control word *S/R* field indicating a send status. This holds gate G2 in the operated state. The operation of gate G16 causes the line 01 control word to be read out into the storage data register 407, the destroyed location contents being replaced by operation of gate G15.

*Scan #10, Clock Cycle #1, Clock Pulse 2.*—Gate G9 is operated. The operation of gate G9 causes the *S/R* field of the line 01 control word to be sensed. This field being set to one causes no change in the operation of trigger T1 or gate G2, maintaining line 01 in the send status.

*Scan #10, Clock Cycle #1, Clock Pulse 3.*—Gate G6 is operated. The operation of gate G6 causes a bit to be sent from bit position 48 of the character assembly field via line 413 through gate G2 to line 01.

*Scan #10, Clock Cycle #1, Clock Pulse 4.*—Gates G4, G7, G10 and G12 are operated and trigger T2 is set to the one state. The operation of gates G10 and G12 cause the contents of the *n* bit mark field (6) and the *m* bit mark count field (which is now 6) to be sent to the compare circuit 412. It is assumed that at scan #10 all of the 6 bits in the character assembly field have been sent out on line 1. The *m* bit field will therefore have been incremented five times since its contents were originally set to one. The compare circuit 412 will therefore set the trigger T2 to the one state ($m=n$) indicating that a full character has been transmitted on line 01. Though gates G4 and G7 are operated to shift the contents of the character assembly field, this shift has no effect, since this field is empty.

*Scan #10, Clock Cycle #1, Clock Pulse 5.*—Gates G14 and G26 are operated and trigger T2 remains set to the one state. The operation of gate G14 causes the address field of the control word line 01 (4–0, which designates block 4 location 0) to be sent to the memory address register I 416 via gate G26, and also through the add circuit 414 which increments the address (to 4–1). The address field now contains the designation of block 4 location 1. The contents of the memory address register I 416 are applied to the memory address selector 415 to cause the contents (j) of block 4 character location 0 to be read out of the memory 2 during the next pulse.

*Scan #10, Clock Cycle #1, Clock Pulse 6.*—Gates G17, G21 and G25 are operated, trigger T2 remaining set to the one state. The operation of gate G25 causes the character (j) stored in memory location 4–0 to be read into the memory data register 417 character field, the character being rewritten into memory 2 via the gate G21 to compensate for destructive readout.

*Scan #10, Clock Cycle #1, Clock Pulse 7.*—Gates G4 and G13 are operated, trigger T2 remaining set to the one state and a signal appearing on the reset (*m*) line. The operation of gate G4 causes the character (j) to be transferred from the character field of the memory data register 417 via the cable 431 into the character assembly field of the line 01 control word stored in the storage data register 407. The operation of the reset (*m*) line causes the *m* bit count to be reset to the initial one condition and resets the trigger T2 to the zero state ($m \neq n$). The operation of gate G13 causes the decoder 425 to examine the low order 5 bits of the address field which, not being all ones, causes the trigger T3 to remain set to the zero state ($LO \neq 1$'s).

*Scan #10, Clock Cycle #1, Clock Pulse 8.*—Gate G15 is operated. The operation of gate G15 causes the control word for line 01 to be re-entered into the storage 3.

*Scan #12, Clock Cycle #2, Clock Pulse 1.*—Gates G2, G15 and G16 are operated and trigger T1 is in the one state. Trigger T1 is assumed to be in the one state because the clock cycle (#1) preceding this clock cycle during this scan (#12) occurred in the send mode. The operation of gate G16 causes the control word for line 02 to be read from the storage 3 and entered into the storage register 407, it being re-entered in the storage 3 via gate G15. It is assumed that a full character (t) has, with the exception of the last bit, been assembled so that the *m* bit count field (initially set to one) of this control word has become equal to 6.

*Scan #12, Clock Cycle #2, Clock Pulse 2.*—Gates G1 and G9 are operated. Gate G1 will remain operated for the balance of the clock cycle. The operation of gate G9 causes the *S/R* field to be examined, which field being set to the zero state causes the trigger T1 to be set to the zero state operating gate G1 and disabling gate G2. As a result, line 02 is placed in the receive mode.

*Scan #12, Clock Cycle #2, Clock Pulse 4.*—Gates G4, G10 and G12 are operated and trigger T2 is set to the one state. The operation of gates G10 and G12 cause the *n* bit mark field (6) and the *m* bit count field (6) to be sent to the compare circuit 412. As previously stated, the fields are both now set to indicate a value 6, the trigger T2 being set to the one state ($m=n$) as a result. The operation of gate G4 causes a bit to be entered into bit position 43 of the character assembly field via the receive gates 408 under the control of the *n* bit field.

*Scan #12, Clock Cycle #2, Clock Pulse 5.*—Gates G7, G14, G18, G26 and G28 are operated and trigger T2 remains set to the one state. The operation of gates G14 and G26 send the contents of the address field (0–0) of the storage data register 407 to the memory address register I 416. Operation of the gates G7 and G18 causes the fully assembled character (t) in the character assembly field of the storage data register 407 to be sent to the character field of the memory data register 417. The operation of gate G28 transfer the character (t) from the character field of the memory data register 417 into the memory 2. The memory address register I 416 will cause the memory address selector 415 to store the contents of the character field of the memory data register in block 0 location 0 as was indicated in the address field of the storage data register 407. Operation of gate G14 also increments the contents (from 0–0 to 0–1) of the storage data register 407 address field.

*Scan #12, Clock Cycle #2, Clock Pulse 7.*—Gate G13 is operated, a signal is applied to the line reset *m* and trigger T2 is reset to the zero state. The operation of the gate G13 causes the decoder 425 to examine the low order 5 bits of the storage data register 407 address field which, not being all ones, causes the trigger T3 to remain set to the zero state ($LO \neq 1$'s). The reset *m* signal causes the *m* bit count field to be reset to contain a one and the trigger T2 to be reset to the zero state ($m \neq n$).

*Scan #12, Clock Cycle #2, Clock Pulse 8.*—Gate G15 is operated. The operation of gate G15 causes the line 02 control word to be re-entered into the storage 3.

*Operation: Block Assignment (FIG. 5d)*

*Scan #560, Clock Cycle #1, Clock Pulses 1–7.*—During scan #560, when line 01 is scanned, a bit is sent out on line 1 and the fact that a complete character (e) has been sent from the character assembly area of the storage data register 407 is recognized by the setting of the trigger T2 to the one state ($m=n$). The operations involved in accomplishing this during clock pulses 1–7 is essentially the same as those previously explained with reference to scan #10, clock cycle #1, clock pulses 1–6. It is assumed that 30 characters have been removed from block 4 and that another character (1) which is the last (31st) character in the block (4) will be placed in the character assembly field from memory 2 location 4–31. Incrementing of the line 01 control word (to 4–32) however indicates that the next character (*b*1) of the message will have to be supplied by another block. This other character (*b*1) will be taken from the block (indicated as block 12 by the block 4 block control character) in which the message is continued.

The operation of the gate G13 during clock pulse 7 causes the decoder to examine the low order bit positions of the incremented address field (4–32) of control word line 01 in the storage data register 407. Since the binary representation of the number 32 is five ones the trigger T3 will be set to the one state ($LO$=1's).

*Scan #560, Clock Cycle #1, Clock Pulse 8.*—Gate G24 is operated and trigger T3 remains set to the one state. The operation of gate G24 causes the address $Y+1$ of the inventory word to be entered into the memory address register I 416.

*Scan #560, Clock Cycle #1, Clock Pulse 9.*—Gates G17, G21 and G25 are operated, trigger T3 remaining set to the one state. The operation of gate G25 causes the inventory word to be read out of the memory 2. The operation of gate G17 causes the inventory word, which has a next block address field of 2 and the end block address field of 6, to be entered into the memory data register 417. The operation of the gate G21 causes the destroyed inventory word in the memory location $Y+1$ to be regenerated.

*Scan #560, Clock Cycle #1, Clock Pulse 10.*—Gates G14, G18, G27 and G28 are operated, trigger T3 remains set to the one state and a signal is applied on the LO complement input to the memory address register I 416. The operation of gates G14 and G18 causes the address field of the line 01 control word, (which is 4–32) to be transfered from the storage data register 407 to the address field of the memory data register 417. Since the address field holds only the high order part of the address, the low order part is in effect changed to zero (the address becoming 4–0). The operation of gate G27 and the application of a signal on the LO complement input of the memory address register I 416 causes the end block address field (which contains a 6) of the memory data register 417 to be entered into the memory address register I 416 and low order ones to be forced selecting the location of the block control character (location 6–32) at the end of the empty chain. Operation of the gate G28 causes the adjusted address field (4–0) from the line 01 control word, which is now stored in the memory data register 417, to be entered into the block control character of the end block (6) of the chain indicated by the end block address field of the inventory word. Thus the newly available block (4) is added to the empty chain.

*Scan #560, Clock Cycle #1, Clock Pulse 11.*—Gates G14 and G19 are operated, trigger T3 remaining set to the one state. The operation of gates G14 and G19 causes the transfer of the address field (which was adjusted to the number 4–0) of the line 01 control word stored in the storage data register 407 to the end block address field of the inventory word stored in the memory data register 417. Thus the inventory word is made to reflect the addition of the new block (4) to the empty chain.

*Scan #560, Clock Cycle #1, Clock Pulse 12.*—Gate G27 is operated and a signal is applied on the LO complement input to the memory address register I 416, trigger T3 remaining set to the one state. The operation of gate G27 and the LO complement line (which forces low order ones) causes the memory address selector 415 to access the location (4–32) of the block control character of the newly available block (4) supplied by the line 01 control word to the empty chain. This block control character (which contains: 12–0) will indicate where the message begun in block 4 continued.

Scan *#560, Clock Cycle #1, Clock Pulse 13.*—Gates G3, G18 and G25 are operated, trigger T3 remaining set to the one state. The operation of gates G25 and G18 causes the block control character (containing the number 12–0) of the block (4) in which the line 01 message was begun to be read out of the memory 2 and into the address field of the memory data register 417. The operation of gate G3 causes this address (12–0) to be entered into the address field of the line 01 control word stored in the storage data register 407, thus indicating where the next character (b1) of the line 01 message will be obtained.

*Scan #560, Clock Cycle #1, Clock Pulse 16.*—Gates G15, G21 and G24 are operated, trigger T3 remaining set to the one state. The operation of gates G21 and G24 causes the inventory word to be stored at location $Y+1$ of the memory 2, the address $Y+1$ being supplied to the memory address register II 427 via line 430. The operation of gate G15 causes the line 01 control word to be stored in the storage 3 at its proper location.

*Scan #560, Clock Cycle #1, Clock Pulse 20.*—A signal appears on the line reset T3 in order to reset the trigger T3 to the zero state ($LO\neq$1's).

*Scan #570 Clock Cycle #2, Clock Pulses 1–7.*—During scan #570, line 02 is scanned, a bit is received on line 02 and the fact that a complete character (b) has been received from the line is recognized by the setting of trigger T2 to the one state ($m=n$). The operations involved in accomplishing this during clock pulses 1–7 are identical to those previously explained with reference to scan #10, clock cycle #1, clock pulses 1–7. This last character (b) is the 31st to be transferred to block 0 indicated by the address field (0–31) of the line 02 control word stored in the storage data register 407. Incrementing this address (to 0–32) results in an indication that another block will have to be assigned from the empty chain in order to store the next character received on the line 02. Recognition of the occurrence of five low order ones is accomplished by the decoder 425, setting the trigger T3 to the one state ($LO$=1's) at clock pulse 7 as previously explained with reference to scan #560, clock cycle #1, clock pulse 7.

*Scan 570, Clock Cycle #2, Clock Pulse 8.*—Gates G14, G18, G24 and G28 are operated, trigger T3 remaining set to the one state. The operation of the gate G24 causes the transfer of the address Y from the memory address register II 427 to the memory address register I 416 causing the memory address selector 415 to gain access to the location Y (which will be used to store the line 02 control word address field). The operation of the gates G14 and G18 causes the transfer of the block address (0–31) in the line 02 control word in the storage data register 407 address field to the address field (which having no low order positions adjusts the address to 0—0) of the memory data register 417. Operation of a gate G28 causes the writing of this block address (0—0) into the memory 2 location Y.

*Scan #570, Clock Cycle #2, Clock Pulse 9.*—Gates G15 and G24 are operated, trigger T3 remaining set to the one state. The operation of gate C24 causes the address $Y+1$ of the inventory word stored in the memory 2 to be transferred from the memory address register II 427 to the memory address register I 416. The operation of the gate G15 causes the line 02 control word contained in the storage data register 407 to be replaced in the storage 3.

*Scan #570, Clock Cycle #2, Clock Pulse 10.*—Gates G17, G21, G22, G23 and G25 are operated and a signal is applied to the LO complement line 429, trigger T3 remaining set to the one state. Operation of gate G25 causes the inventory word located in the memory 2 address $Y+1$ to be read from the memory 2. Operation of gate G17 causes the inventory word (which has a next block address field with a valve of 2–0 and an end block address field of value 4–0) to be entered into the memory data register 417. Operation of the gate G21 regenerates the contents of memory 2 location $Y+1$. Operation of gate G23 causes the next block address field (2–0) to be transferred from the memory data register 417 into the buffer A field of the storage data register 407. Operation of the gate G22 causes the next block address field (2–0) to be also transferred into the memory address register I 416, where, in association with the signal on the LO complement line 429, selection of a block control character at memory 2 address 2–32 occurs.

*Scan #570, Clock Cycle #2, Clock Pulse 11.*—Gates G5, G18, G25 and G28 are operated, trigger T3 remaining set to the one state. The accessed block control character (13–0) which indicates the block in the empty chain following the block (2) specified by the inventory word next block field, is thus addressed and made available during this clock pulse. Therefore, operation of gate G25 causes this block control character (13–0) to be read from the memory 2. Operation of gates G18 and G5 cause this number (13–0) to be entered into the storage data register 407 buffer B field via the memory data register 417 address field. Operation of gate G28 causes the regeneration of the information read from the memory 2.

*Scan #570, Clock Cycle #2, Clock Pulse 12.*—Gates G11, G20 and G24 are operated, trigger T3 remaining set to the one state. Operation of gates G11 and G20 causes the contents (13–0) of the buffer B field of the storage data register 407 to be entered into the next block address field of the inventory word in memory data register 417. In this way the empty chain has been reduced by one block (block 2 being removed). Operation of the gate G24 causes the address Y to be entered into the memory address register I 416 causing accessing of the address of the block (0) previously assigned to the line 02 for message assembly.

*Scan #570, Clock Cycle #2, Clock Pulse 13.*—Gates G25 and G26 are operated, trigger T3 remaining set to the one state and a signal being applied to the LO complement input of the memory address register I 416. Operation of the gate G25 causes the contents (0–0) of location Y to be read from the memory 2. Operation of the gate G26 causes the contents (0–0) to be entered into the memory address register I 416 where the low order 5 bits are set to ones. Thus the memory address selector 415 is made to access the block control character (at location 0–32) of the block (0) originally assigned to line 02 for message assembly.

*Scan #570, Clock Cycle #2, Clock Pulse 14.*—Gates G7, G18, G24 and G28 are operated, trigger T3 remaining set to one state. The operation of gates G7, G18 and G28 causes the newly allocated block address (2–0) to be transferred from the buffer A field of the storage data register 407 via the address field of the memory data register 417 into the memory 2 location (0–32) of the block control character of the previous block (0) assigned to line 02 for message assembly, thus indicating where the line 02 message being assembled will be continued. Operation of gate G24 causes the address Y of the location in the memory 2 where the address of the previous block (0) assigned to line 02 is stored to again be accessed.

*Scan #570, Clock Cycle #2, Clock Pulse 15.*—Gates G7, G18 and G28 are operated, trigger T3 remaining set to the one state. Operation of gates G17, G18 and G28 causes the location Y in the memory 2 to be set to the address (2–0) of the newly allocated block removed from the empty chain. This block address (2–0) being transferred from the buffer A field of the storage data register 407 into the memory 2 via the address field of the memory data register 417.

*Scan #570, Clock Cycle #2, Clock Pulse 16.*—Gates G15, G16 and G24 are operated, the trigger T3 remaining set to the one state. The operation of gate G16 causes the line 02 control word to be entered into the storage data register 407, regeneration being accomplished through gate G15. The operation of gate G24 again causes the selection of address Y by the memory address selector 415 via the memory address register I 416. Address Y contains a designation of the new block (2) assigned to the line 02 from the empty chain.

*Scan #570, Clock Cycle #2, Clock Pulse 17.*—Gates G3, G18, G21, G24 and G25 are operated, trigger T3 remaining set to the one state. The operation of gates G25, G18 and G3 cause the address field of the line 02 control word contained in the storage data register 407 to be set to address (2–0) which indicates the block address in which message assembly is to continue. Operation of gate G24 causes the address $Y+1$ of the inventory word to be entered into the memory address register I 416. Operation of gate G21 causes the inventory word in the memory data register 417 to be stored in memory 2 at address $Y+1$.

*Scan #570, Clock Cycle #2, Clock Pulse 18.*—Gate G15 is operated, trigger T3 remaining set to the one state. The operation of gate G15 causes the line 02 control word to be stored in its location in the storage 3.

*Scan #570, Clock Cycle #2, Clock Pulse 20.*—A signal is applied on the line reset T3, resetting the trigger T3 to the zero state ($LO \neq 1$'s).

Operation of the apparatus shown in FIG. 3 continues in accordance with the previous description until message handling is discontinued. The apparatus described receives and transmits messages on a plurality of lines wherein each line is assigned a number of blocks in storage either for assembling messages or as a source of messages. A pool or queue of empty blocks is maintained to service lines receiving messages which are longer than the message assembly blocks allotted to the receiving lines. Blocks are subtracted from this queue for the use of receiving lines and are added to this queue when transmitting lines completely send messages from blocks assigned to them. The apparatus includes an inventory word for indicating the current beginning and end of the queue. Means are provided for chaining blocks together to form the queue and also for adjusting the invention word when blocks are subtraced or added to the queue.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In combination:

a plurality of memory sections arranged into a chain, including a beginning section and an ending section, each section comprising a number of addressable locations, including a first location and a last location, for storing as states signals representative of characters, the character in the last location in each of said sections, except said ending section, being interpreted as the address of the first location in a different one of said plurality of sections;

addressing means, connected to said plurality of chained memory sections, for gaining access to any character location;

inventory means, connected to said addressing means, for storing as states a designation of the address of the first location of the beginning section of said plurality of sections in said chain, and a designation of the address of the first location of the ending section of said plurality of chained sections;

a number of utilization means, connected to said inventory means and to said chain of memory sections, each operable to generate a first signal indicative of a need for one of said plurality of memory sections and a second signal indicative of the availability of a new memory section which is not one of said plurality of sections in said chain and each of said utilization means being operable to receive and to supply designations of memory sections;

first control means, connected to said plurality of chained memory sections, said inventory means and said number of utilization means, operable in accordance with said first signal from said utilization means to make said utilization means operable to receive a designation of the beginning memory section designated by said inventory means;

second control means, connected to said inventory means and said number of utilization means operable in accordance with said second signal from said utilization means to make said utilization means operable to supply a designation of a said new memory section;

third control means, connected to said plurality of chained memory sections, said inventory means and said number of utilization means operable in accordance with said first signal from said utilization means to adjust said inventory means to designate the address of the first location of a next memory section in said chain following the beginning memory section received by said utilization means;

and fourth control means, connected to said plurality of chained memory sections, said inventory means and said number of utilization means operable in accordance with said second signal from said utilization means to adjust said inventory means to designate the address of the first location of the new memory section supplied by said utilization means.

2. The combination of claim 1, further including:

fifth control means, connected to said plurality of chained memory sections, said inventory means and said number of utilization means operable in accordance with said second signal from said utilization means to cause the last location in said ending section to indicate the address of the first location of the new memory section.

3. The combination of claim 2, wherein said utilization means first signal is additionally indicative of completed use of an old memory section which is not one of said plurality of sections in said chain, further including:

sixth control means connected to said inventory means and said number of utilization means operable in accordance with said first signal from said utilization means to cause the last location in said old memory section to indicate the address of the first location of the beginning section.

4. In combination:

a plurality of chained memory sections, including a beginning section, each section comprising a number of addressable locations, including a first location and a last location, for storing as states signals representative of characters, the character in the last location in each of said sections being interpreted as the address of the first location in a different one of said plurality of sections;

inventory means, for storing as states a designation of the address of the first location of the beginning section of said plurality of chained sections;

a number of utilization means, connected to said inventory means and to said plurality of chained memory sections, each operable to generate a signal indicative of a need for one of said plurality of memory sections, each of said utilization means being operable to receive designations of memory sections;

first control means, connected to said plurality of chained memory sections, said inventory means and said number of utilization means, operable in accordance with said signal from said utilization means to make said utilization means operable to receive the designation of the beginning memory section designated by said inventory means;

and second control means, connected to said plurality of chained memory sections, said inventory means and said number of utilization means operable in accordance with said first signal from said utilization means to adjust said inventory means to designate the address specified in the last location of the beginning memory section.

5. In combination:

a plurality of chained memory sections, including an ending section, each section comprising a number of addressable locations, including a first location and a last location, for storing as states signals representative of characters, the character in the last location in each of said sections, except said ending section, being interpreted as the address of the first location in a different one of said plurality of sections;

inventory means, for storing as states a designation of the address of the first location of the ending section of said plurality of chained sections;

a number of utilization means, connected to said inventory means and to said plurality of chained memory sections, each operable to generate a signal indicative of the availability of a new memory section which is not one of said plurality of sections and each of said utilization means being operable to supply designations of memory sections;

first control means, connected to said inventory means and said number of utilization means operable in accordance with said signal from said utilization means to make said utilization means operable to supply said new memory section designation;

and second control means, connected to said plurality of chained memory sections, said inventory means and said number of utilization means operable in accordance with said first signal from said utilization means to adjust said inventory means to designate the address of the first location of the new memory section supplied by said utilization means.

6. Apparatus for pooling available memory sections for use by a number of utilization devices, including:

memory means, comprising a plurality of sections arranged in a chain, each section except the last indicating another continuing section;

queue inventory means, connected to said memory means, for indicating the beginning and the end of said chain;

allocation means connected to said queue inventory means for allocating to one of the utilization devices at a time the beginning section of said chain as indicated by said queue means and for allocating to said chained memory, sections made newly available by one of the utilization devices at a time;

control means connected to said queue means and said allocation means responsive to the utilization devices one at a time, to subtract allocated sections from said chain in accordance with the indications of said queue inventory, and to add available sections to said chain in accordance with the indications of said queue inventory means;

and adjustment means connected to said queue inventory means for adjusting said inventory indications to reflect the current beginning and end of said chain.

7. Apparatus for pooling available memory sections for use by a number of utilization devices, including:

memory means, comprising a plurality of sections arranged in a chain, each section indicating another continuing section;

queue inventory means, connected to said memory means, for indicating the beginning of said chain;

allocation means connected to said queue inventory means for allocating to one of the utilization devices at a time the beginning section of said chain as indicated by said queue means;

control means connected to said queue means and said allocation means responsive to the utilization devices one at a time, to subtract allocated sections from said chain in accordance with the indications of said queue inventory means;

and adjustment means connected to said queue inventory means for adjusting said inventory indications to reflect the current beginning of said chain.

8. Apparatus for pooling available memory sections for use by a number of utilization devices, including:

memory means, comprising a plurality of sections arranged in a chain, each section except the last indicating another continuing section;

queue inventory means, connected to said memory means, for indicating the end of said chain;

allocation means connected to said queue inventory means for allocating to said chained memory sections made newly available by one of the utilization devices at a time;

control means connected to said queue means and said allocation means responsive to the utilization devices one at a time, to add available sections to said chain in accordance with said queue inventory means;

and adjustment means connected to said queue inventory means for adjusting said inventory indications to reflect the current end of said chain.

9. In combination:

a plurality of lines for receiving and sending information;

a plurality of memory areas connected to said lines for assembling information received by said lines, and supplying information to be sent on said lines;

means connected to said memory areas for segregating memory areas not used for assembling or supplying information; ;

means associated with each segregated memory area for specifying another memory area, segregated areas being thus chained together;

indication means connected to said memory areas for indicating a current beginning and current end memory area of the segregated chained areas;

means connected to said lines and said indication means, active in association with lines receiving information for allocating to a line the current beginning memory area of the segregated chain when the area previously allocated to the line is filled;

means connected to said lines and said indication means active in association with lines sending information for allocating to the end of the segregated chain, memory areas no longer used for supplying information;

and means connected to said indication means and said specification means for adjusting said indication means and said specification means to reflect current ones of aforesaid allocations.

10. In combination:

a plurality of lines for receiving information;

a plurality of memory areas connected to said lines for assembling information received by said lines;

means connected to said memory areas for segregating memory areas not used for assembling information;

means associated with each segregated memory area for specifying another memory area, segregated areas being thus chained together;

indication means connected to said memory areas for indicating a beginning memory area of the segregated chained areas;

means connected to said lines and said indication means, active in association with lines receiving information for allocating to a line the current beginning memory area of the segregated chain when the area previously allocated to the line is filled;

and means connected to said indication means for adjusting said indication means to reflect aforesaid allocation.

11. In combination:

a plurality of lines for sending information;

a plurality of memory areas connected to said lines for supplying information to be sent on said lines;

means connected to said memory areas for segregating memory areas not used for supplying information;

means associated with each segregated memory area for specifying another memory area, segregated areas being thus chained together;

indication means connected to said memory areas for indicating an end memory area of the segregated chained areas;

means connected to said lines and said indication means active in association with lines sending information for allocating to the end of the segregated chain, memory areas no longer used for supplying information;

and means connected to said indication and specifying means for adjusting said indication means and said specifying means to reflect aforesaid allocation.

12. Apparatus for queuing available memory sections comprising:

a first group of memory sections initially unavailable for use;

a second group of memory sections initially available for use, arranged in a queue;

specifying means associated with each of the memory sections in said second group for specifying another memory section next in position in the queue;

identifying means associated with said second group for identifying memory section in said second group that is at the end of the queue;

signaling means associated with said first group for signaling that a memory section in said first group has become available;

and means operable by said signaling means for placing the available memory section from said first group at the end of the queue in said second group, and adjusting said specifying means and said identifying means to reflect the addition to said queue.

13. Apparatus for queuing available memory sections, comprising:

a first group of memory sections unavailable for use;

a second group of memory sections initially available for use, arranged in a queue;

specifying means associated with each of the memory sections in said second group for specifying another memory section next in position in the queue;

identifying means associated with said second group for identifying the memory section in said second group that is the head of the queue;

signaling means associated with said first group for signaling that said first group requires an additional memory section;

and means operable by said signaling means for subtracting the memory section that is at the head of the queue from said second group and placing it into said first group, and adjusting said specifying means and said identifying means to reflect said subtraction from the queue.

14. Apparatus for queuing available memory sections, comprising:

a first group of memory sections initially unavailable for use;

a second group of memory sections initially available for use, arranged in a queue;

specifying means associated with each of the memory sections in said second group for specifying another memory section next in position in the queue;

identifying means associated with said second group for identifying the memory section in said second group that is at the head of the queue and the memory section in said group that is at the end of the queue;

first signaling means associated with said first group for signaling that a memory section in said first group has become available;

second signaling means associated with said first group for signaling that said first group requires an additional memory section;

means operable by said first signaling means for placing the available memory section from said first group at the end of the queue in said second group, and adjusting said specifying means and said identifying means to reflect the addition to said queue;

and means operable by said second signaling means for substracting the memory section that is at the head of the queue from said second group and placing it into said first group, and adjusting said specifying means and said identifying means to reflect and subtraction from the queue.

15. Allocation means comprising:

a plurality of lines for receiving message signals;

a first number of groups of message assembly areas, one group allocated to each of said lines, each area having a fixed message capacity;

a second number of groups of unallocated message assembly areas;

means associated with said second number of groups for designating, in turn, one area at a time;

means connecting said plurality of lines with corresponding ones of said first number of groups operable to permit assembly of received messages in the areas of said groups;

means associated with said connecting means for indicating when the message received on an active line equals the message capacity of a message assembly area in a corresponding one of said first number of groups;

and means associated with said designating means and said indicating means operable by said indicating means to allocate, in accordance with said designating means one area from said second number of groups to the group, of the first number of groups, corresponding to the active line.

16. The allocation means of claim 15, wherein said area message capacity is fixed at a value equal to a power of two, and there is provided:

means associated with said indicating means and each of said first number of groups for specifying a current value of the message capacity used in one area of each of said groups;

said indicating means being operated when the specifying means specifies a current value having a binary value expressed as all ones.

17. Allocation means, comprising:

a plurality of lines for sending message signals;

a first number of groups of message source areas, one group allocated to each of said lines, each area having a fixed message capacity;

a second number of groups of unallocated message assembly areas;

means associated with said second number or groups for designating in turn one area at a time;

means connecting said plurality of lines with corresponding ones of said first number of groups operable to permit sending of messages from said source areas;

means associated with said connecting means for indicating when the message sent on an active line equals the message capacity of a message source area in a corresponding one of said first number of groups;

and means, associated with said designating means and said indicating means, operable by said indicating means to allocate an area from the group of said first number of groups corresponding to the active line, to the second number of groups, said designating means being made operable to designate said allocated area.

18. The allocation means of claim 17, wherein said area message capacity is fixed at a value equal to a power of two, and there is provided:

means associated with said indicating means and each of said first number of groups for specifying a current value of the message capacity used in one area of each of said groups;

said indicating means being operated when the specifying means specifies a current value having a binary value expressed as all ones.

19. Transfer means, comprising:

a plurality of lines for communicating message signals;

a first number of groups of message areas, one group allocated to each of said lines, each area having a fixed message capacity;

a second number of groups of unallocated message areas;

means associated with said second number of groups for designating, in turn, one area at a time;

means connecting said plurality of lines with corresponding ones of said first number of groups operable to permit messages to be communicated between the areas of said groups and said lines;

means associated with said connecting means for indicating when the message communicated on an active line equals the message capacity of an area in a corresponding one of said first number of groups of areas;

and means associated with said designating means and said indicating means operable by said indicating means, in accordance with said designating means to transfer one area between said second number of groups and the group, of the first number of groups, corresponding to the active line.

20. The transfer means of claim 19, wherein said area message capacity is fixed at a value equal to a power of two, and there is provided:

means associated with said indicating means and each of said first number of groups for specifying a current value of the message capacity used in one area of each of said groups;

said indicating means being operated when the specifying means specifies a current value having a binary value expressed as all ones.

21. Apparatus for chaining memory areas of data locations together, including:

a memory having addressable information locations arranged into areas, each area comprising a number of locations equal to a power of two, the last location in each area being available to specify the address of a first location of another area;

a number of addressing means connected to said memory for specifying, as binary numbers, the addresses of locations within areas of said memory;

recognition means associated with said addressing means operable to generate a recognition signal when any of said addressing means specifies, as a binary number composed entirely of ones, the address of a last location within one of the areas of said memory;

and utilization means, connected to said memory and said recognition means, operable in the absence of said recognition signal for utilizing the information from the addressed locations as data, and operable upon the occurrence of said recognition signal for utilizing the information from the addressed locations as an address.

22. In combination:

a plurality of lines for receiving and sending information;

a plurality of memory areas connected to said lines for assembling information received by said lines, and supplying information to be sent on said lines;

means connected to said memory areas for segregating memory areas not used for assembling or supplying information;

means associated with each segregated memory area for specifying another memory area, segregated areas being thus chained together;

indication means connected to said memory areas for indicating a current beginning memory area of the segregated chained areas;

means connected to said lines and said indication means, active in association with lines receiving information for allocating to a line the current beginning memory area of the segregated chain when the area previously allocated to the line is filled;

means connected to said lines and said indication means active in association with lines sending information for allocating to the segregated chain, memory areas no longer used for supplying information;

and means connected to said indication and specification means for adjusting said indicating means and said specification means to reflect current ones of aforesaid allocations.

23. Apparatus for queuing available memory sections, comprising:

a first group of memory sections;

a second group of memory sections, arranged in a queue;

specifying means associated with each of the memory sections in said second group for specifying another memory section next in position in the queue;

identifying means associated with said second group for identifying the memory section in said second group that is at the head of the queue;

first signaling means associated with said first group for signaling that a memory section in said first group has become available;

means, associated with said memory sections and said specifying, identifying and first signaling means, operable by said first signaling means for placing the available memory section from said first group into the queue in said second group, and adjusting said specifying means and said identifying means to reflect the addition to said queue;

second signaling means associated with said first group for signaling that said first group requires an additional memory section;

and means, associated with said memory sections and said specifying, identifying and second signaling means, operable by said second signaling means for subtracting the memory section that is at the head of the queue from said second group and placing it into said first group, and adjusting said specifying means and said identifying means to reflect said subtraction from the queue.

References Cited by the Examiner

UNITED STATES PATENTS

| | | | |
|---|---|---|---|
| 3,017,610 | 1/1962 | Auerbach et al. | 340—172.5 |
| 3,056,113 | 9/1962 | Smith | 340—173 |

ROBERT C. BAILEY, *Primary Examiner.*

MALCOLM A. MORRISON, *Examiner.*